United States Patent [19]
Fu et al.

[11] Patent Number: 5,845,257
[45] Date of Patent: Dec. 1, 1998

[54] SYSTEM AND METHODS FOR SCHEDULING AND TRACKING EVENTS ACROSS MULTIPLE TIME ZONES

[75] Inventors: Xiang Fu, Cupertino; Philippe Richard Kahn; Sonia Lee, both of Scotts Valley, all of Calif.

[73] Assignee: Starfish Software, Inc., Scotts Valley, Calif.

[21] Appl. No.: 609,983

[22] Filed: Feb. 29, 1996

[51] Int. Cl.$^6$ ................................................. G06F 17/60
[52] U.S. Cl. ................................... 705/8; 368/28; 368/21
[58] Field of Search .................. 705/8, 9, 7; 364/705.07, 364/705.08, 443; 345/963; 368/21, 28; 283/2

[56] References Cited

U.S. PATENT DOCUMENTS

| | | | |
|---|---|---|---|
| 5,007,033 | 4/1991 | Kubota et al. | 368/21 |
| 5,448,532 | 9/1995 | Kataoka et al. | 368/10 |
| 5,519,606 | 5/1996 | Frid-Nielsen et al. | 364/401 |

OTHER PUBLICATIONS

Earth Time: *A global clock for Windows* (*Earth Time User Guide*), Datech Network Systems, Inc., 1993, pp. i–iii, 1–46. (textbook).

Lowerre, D.T., *Map Projections in C++*, C/C++ Users Journal, Jun. 1995, pp. 45–56.

*Primary Examiner*—Kevin J. Teska
*Assistant Examiner*—Raymond H. Dalziel
*Attorney, Agent, or Firm*—John A. Smart

[57] ABSTRACT

An electronic Personal Information Manager (PIM) including a calendar/scheduling system with an EarthTime™ module is described. In operation, the system tracks different types of times: "local" time, "home" time, and "remote" time. Home time is the time zone of where the user typically spends most of his or her time; this is usually the time zone for the user's home office. Local time is the time for the locality where the user is located physically at any particular instance in time. "Remote" time represents the time zones of the other individuals (i.e., other than the user). The system may show events and appointments in the user's own "local" time (or other user-selected type of time), regardless of where the user is presently located. Using these three types of time (i.e., "local" time, "home" time, and "remote" time), the system provides improved interface and methods for scheduling and managing activities, such a phone conference, across multiple time zones.

25 Claims, 22 Drawing Sheets

AUTOMATIC ADJUSTMENT
OF EVENT TIMES (1) AT SCOTTS VALLEY

511: ENTER: STAFF MEETING: 10 AM HOME TIME | HONG KONG STOCK MARKET CLOSE 4:50 PM REMOTE TIME

513: TIME DISPLAY:
HOME: 10 AM | 4:50 PM
REMOTE:
LOCAL: 10 AM | 1:50 PM (SAME DAY)

(2) AT SYDNEY

521: ENTER: | | APPT. WITH LOCAL BUSINESS 2:00 PM LOCAL TIME

523: TIME DISPLAY:
HOME: 10 AM | 4:50 PM
REMOTE:
LOCAL: 5:00 AM (NEXT DAY) | 6:50 PM (SAME DAY) | 2:00 PM (SAME DAY)

SYSTEM AND METHODS FOR SCHEDULING AND TRACKING EVENTS ACROSS MULTIPLE TIME ZONES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of information processing and, more particularly, apparatus and methods for managing and scheduling time-based information across multiple time zones.

Successful management of one's time is a goal that every successful professional must achieve. One's business day may be swept away in a deluge of meetings and appointments, all of which must be somehow managed. An attempt to manage this task on paper, such as with a simple wall calendar, is unworkable for all but the simplest of schedules. More likely, such unsophisticated aids to managing one's time will lead to scheduling conflicts, missed appointments, botched deadlines, and angry clients.

The process of time management has been particularly difficult when scheduling and tracking appointments and the like across different time zones. When a business person travels, for instance, he or she must maintain (or adjust) his or her calendar for multiple time zones. Similarly, when scheduling a conference with participants from different time zones, one is required to constantly remain mindful of the particular time zone difference of each of the participants. Moreover, the individual responsible for scheduling the conference does not just juggle a particular time in a given time zone for each participant; instead, he or she must juggle a range of times when each participant is available, thus further complicating the task.

Meeting the actual needs of particular market segments increases the difficulty of the task. A secretary, for instance, might be required to set up a conference call between Tokyo, San Francisco, Washington, and Paris. Here, not only are time zones being crossed but, also, a date zone is being crossed. The secretary might, for instance, attempt to set up the conference for Friday in Washington, only to find that no one is available from Tokyo during the conference as the Tokyo office is closed—it is Saturday.

Traveling professionals also face a similar problem. A business person may have events scheduled in his or her "local" time, such as appointments and recurring events (e.g., weekly staff meetings). Despite the fact that this individual travels to various time zones, the appointments must somehow be managed in a way which is meaningful to him or her. Suppose the business person had a weekly staff meeting at 10:00 AM Pacific Standard Time, every Wednesday. When the business person travels to Sydney, Australia, that staff meeting is no longer at "10:00 AM." At the same time, however, the business person often will have set up one or more meetings while in Sydney, for instance a 9:00 AM meeting on Wednesday. Here, the business person needs to track the local appointment set up in local time—the meeting in Sydney at 9:00 AM Wednesday, Sydney time. Yet, he or she must also coordinate and manage these local appointments (i.e., appointments in local time) with other events and appointments which have been scheduled in time zones different from the one in which the business person is currently staying.

What is needed are system and methods which allow a user, particularly those which travel, to maintain a calendar of appointments and events where the individual appointments and events themselves must be scheduled across various time zones (and even date zones). Specifically, such a system should provide a scheduling calendar capable of tracking of events, such as appointments, conference, and the like, across multiple time zones. In this fashion, users who travel and users who schedule conferences with participants from different time zones can easily determine appropriate times in various locales for scheduling events appropriately.

SUMMARY OF THE INVENTION

The present invention recognizes a user needs flexibility in choosing how appointments, events, and other time-based data are entered and managed, despite the fact that such data spans multiple time zones. According to the present invention, therefore, an electronic Personal Information Manager (PIM including a calendar/scheduling system is provided with an EarthTime™ module of the present inventino. The module provides an interface and methods allowing users to set up multiple calendars, in different time zones, as they travel, as well as set up conferences (e.g., phone conferences, Internet chat sessions, and the like) across various time zones.

In operation, the system of the present invention tracks different types of times. Usually, two types of times are important to the user: "home" time and "local" time. Home time is the time zone of where the user typically spends most of his or her time; this is usually the time zone for the user's home office. Local time is the time for the locality where the user is located physically at any particular instance in time. In addition to home time and local time, the present invention introduces a third type of time: "remote" time. Specifically, the time zones of the other individuals (i.e., other than the user) are treated as remote time. The system may show events and appointments in the user's own "local" time (or other user-selected type of time), regardless of where the user presently is. Using these three types of time (i.e., "local" time, "home" time, and "remote" time), the system of the present invention provides improved interface and methods for scheduling and managing activities, such a phone conference, across multiple time zones.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 15A is a block diagram illustrating the display to a user in "local" time various appointments, events, and other time-based information which are entered into the system in either "home" time, "local" time, or "remote" time.

DETAILED DESCRIPTION OF A PREFERRED EMBODIMENT

The following description will focus on the presently preferred embodiment of the present invention, which is operative in an end-user application running under the Microsoft® Windows environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

System Hardware

Figure 1A:
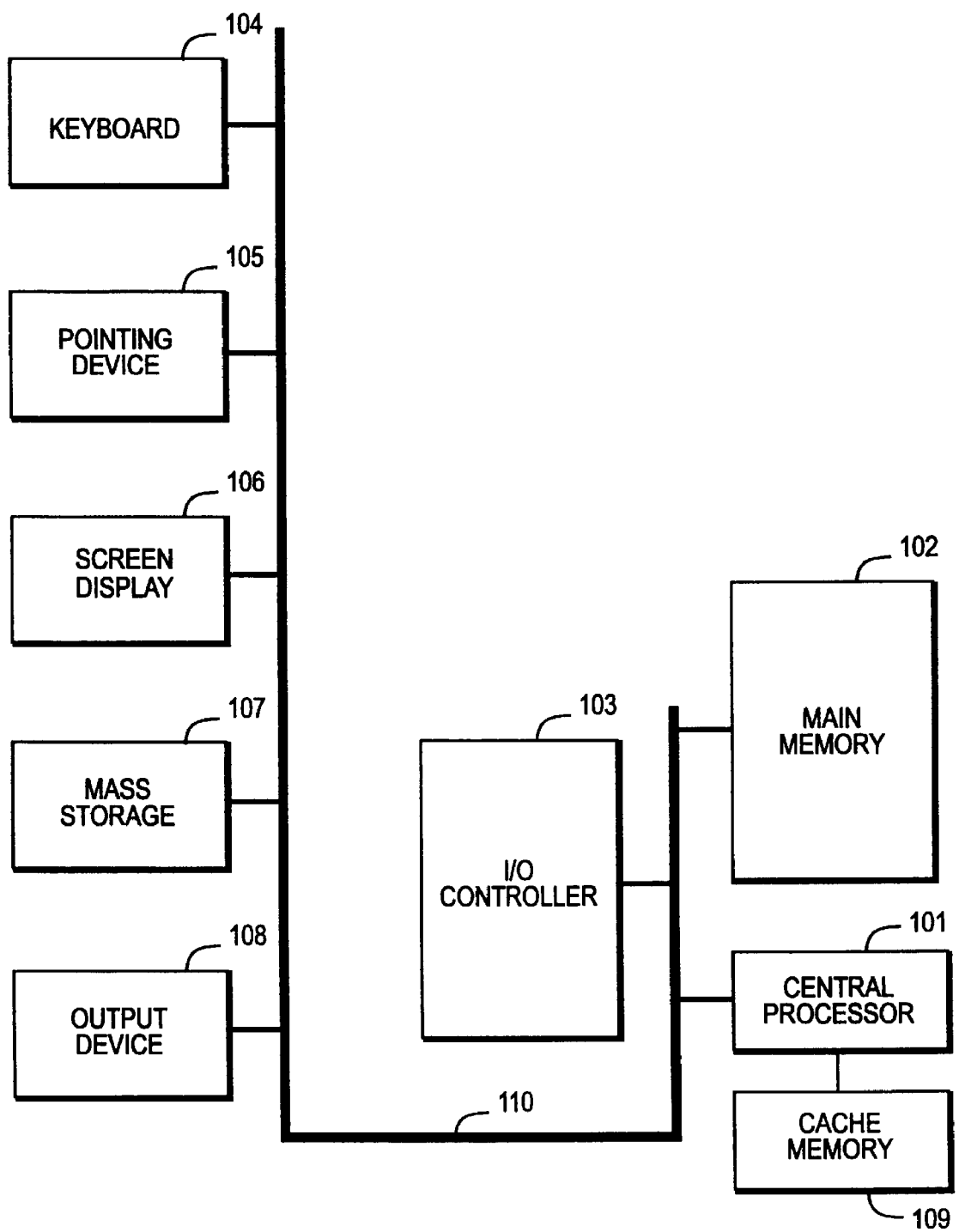
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.). I/O device 108 may include a laser printer, such as an HP Laserjet printer, which is available from Hewlett-Packard of Palo Alto, Calif.

System Software

A. Overview

Figure 1B:
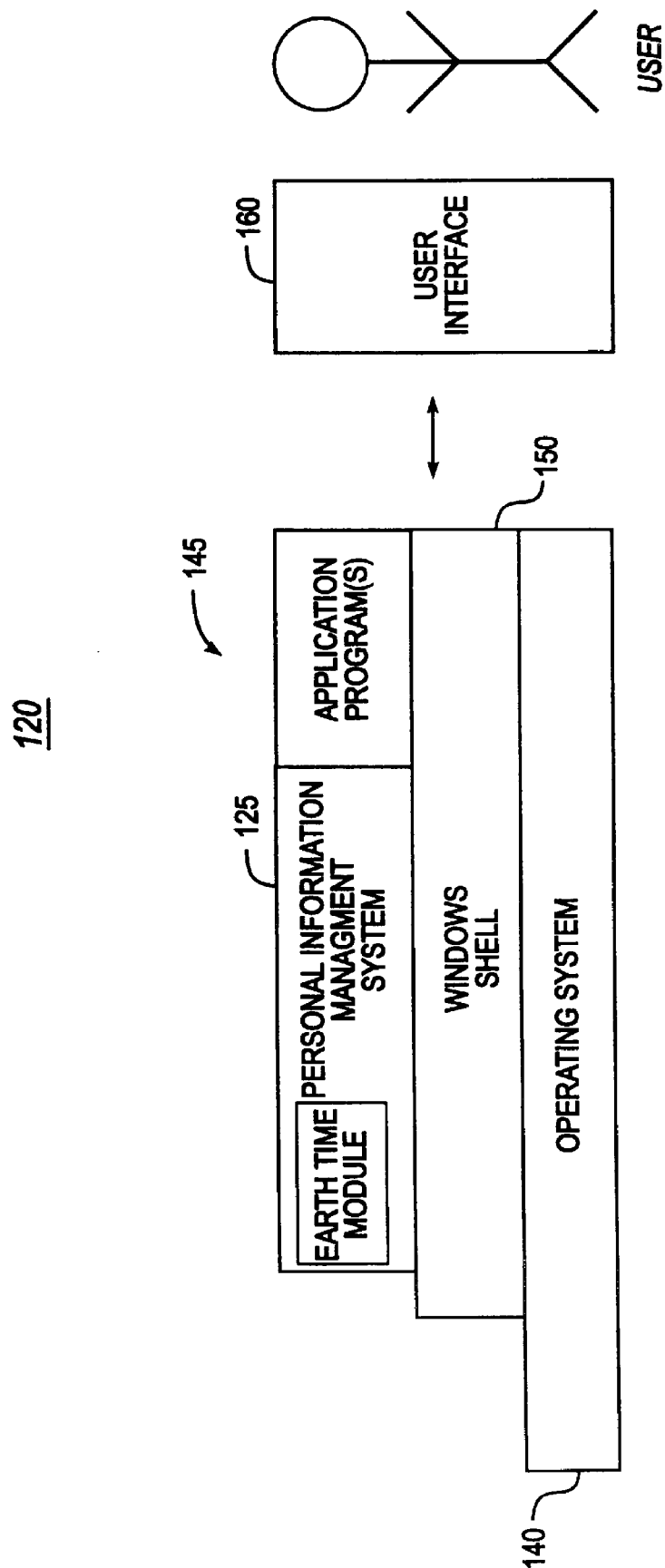
FIG. 1B is a block diagram of a software system of the present invention for controlling the operation of the system of FIG. 1A.

Illustrated in FIG. 1B, a computer software system 120 is provided for directing the operation of the computer system 100. Software system 120, which is stored in system memory 102 and on storage (e.g., disk memory) 107, includes a kernel or operating system (OS) 140 and a windows shell 150. One or more application programs, such as client application software or "programs" 145 may be "loaded" (i.e., transferred from storage 107 into memory 102) for execution by the system 100.

System 120 includes a user interface (UI) 160, preferably a Graphical User Interface (GUI), for receiving user commands and data. These inputs, in turn, may be acted upon by the system 100 in accordance with instructions from operating module 140, windows 150, and/or client application module(s) 145. The UI 160 also serves to display the results of operation from the OS 140, windows 150, and application (s) 145, whereupon the user may supply additional inputs or terminate the session. In a preferred embodiment, OS 140 is MS-DOS and windows 145 is Microsoft® Windows; both are available from Microsoft Corporation of Redmond, Wash. Although shown conceptually as a separate module, the UI is typically provided by interaction of the application modules with the windows shell, both operating under OS 140.

One application software comprises a Personal Information Management (PIM) System 125 which includes an EarthTime™ module of the present invention. In an exemplary embodiment, PIM System 125 comprises Sidekick® 95, which is available (as Part No. SK9510US41000) from Starfish Software, Inc. of Scotts Valley, Calif. A general description of the operation of Sidekick® 95 can be found in its accompanying user manual. Interface and methods provided by the EarthTime™ module of the present invention, in the exemplary embodiment of Sidekick® 95, will now be described in further detail.

Operation of EarthTime™ Module

A. General desktop interface

Figure 2:
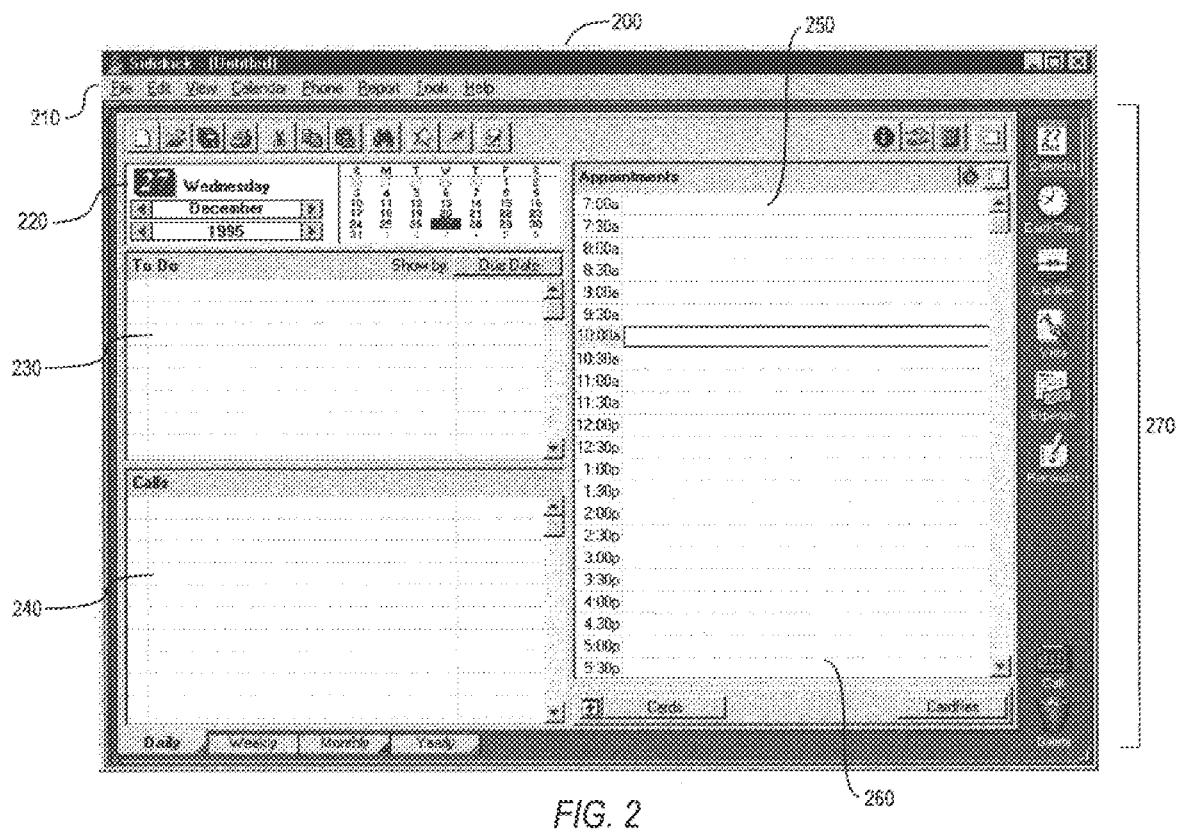
FIG. 2 is a bitmap screenshot illustrating a user interface of a Personal Information Manager which embodies an EarthTime™ module of the present invention.

As shown in FIG. 2, the system provides an electronic appointment calendar interface 200. The interface 200 includes a menu bar 210, for invoking menu items or commands. The interface itself is comprised of particular subregions. A first subregion 220 displays the current time and date, in local time (described in further detail below). Below this region are a To Do region 230 and a Call region 240. The former lists To Do items which the user has included. The latter is a log of calls which the user wishes to track. Actual appointments are displayed in the interface at region 250. Here, appointments are displayed in local time also. The interface also includes a quick lookup or address list 260, for locating particular individuals from the users address book. Finally, the interface includes quick pick icons 270, for quickly switching to other modules of the system.

Figure 3:
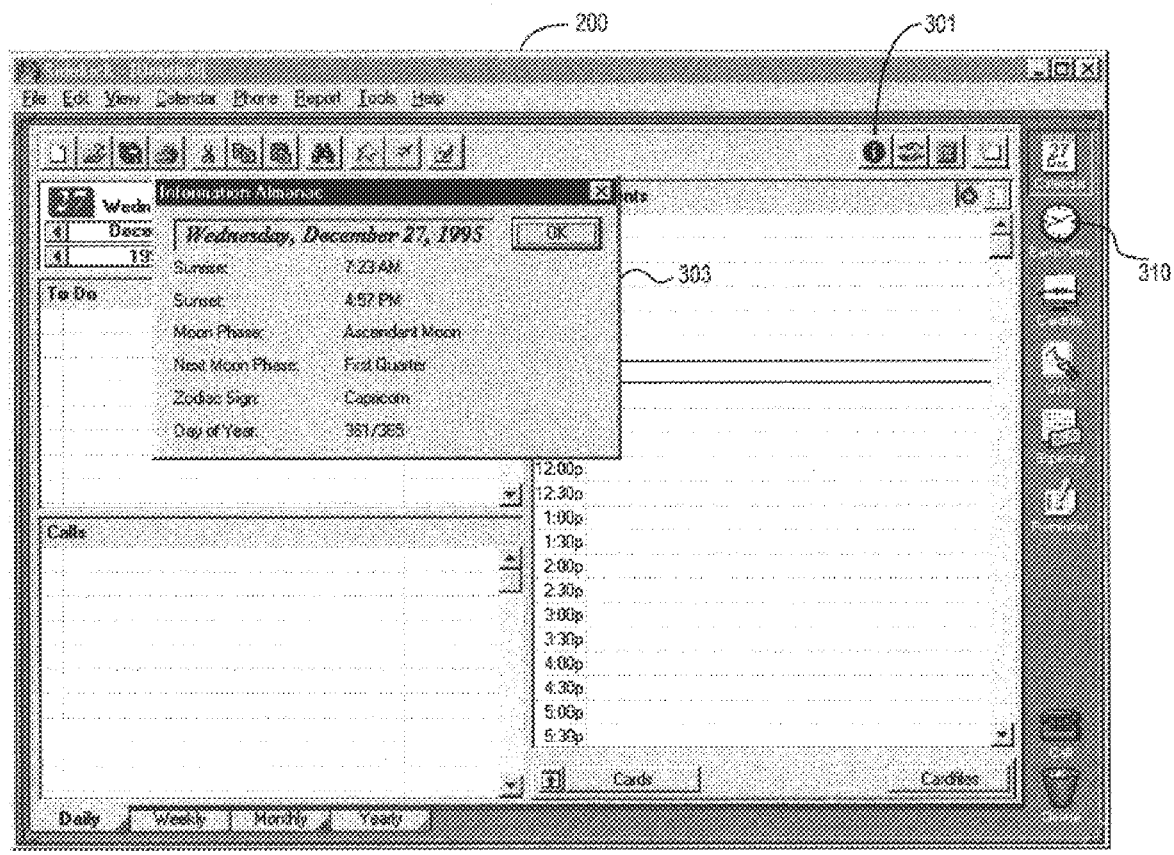
FIGS. 3–13 are bitmap screenshots illustrating user operation of the Personal Information Manager, with particular emphasis on operation of the EarthTime™ module.

As shown in FIG. 3, the interface 200 includes an information button 301. Upon the user selecting this button (e.g., "clicking" on it, with a user input device), the system displays an information almanac dialogue 303. The dialogue 303 displays sunrise and sunset times (i.e., almanac information) in local time—that is, at the time for the location where the user currently is. Thus for our California traveler who is now in Sydney, Australia, the information almanac displays the sunrise and sunset information for Sydney, not California. Application of the different types of time impact various features of the system, as just illustrated.

B. Types of time: Rome time, Local time, and Remote time

The present invention provides an interface where users can set up multiple calendars, in different time zones, as they travel, as well as set up conferences (e.g., phone conferences, Internet chat sessions and the like) across various time zones. Usually, two types of times are important to the user: "home" time and "local" time. Home time is the time zone of where the user typically spends most of his or her time; this is usually the time zone for the user's home office. Local time is the time for the locality where the user is located physically at any particular instance in time.

In addition to home time and local time, the present invention introduces a third type of time: "remote" time.

This is perhaps best explained by example. Consider a user based in California who is currently traveling in Sydney, Australia and needs to set up a phone conference with one person in Tokyo and another in Washington, D.C. Here, the time zones for the individuals in Tokyo and Washington, D.C. are treated as remote time. By treating the time zones of the other individuals (i.e., other than the user) as remote time, the system of the present invention allow the user to easily schedule events, such a phone conference, at reasonable hours (when possible).

C. Visual representation of time: the EarthTime™ interface

Figure 4:
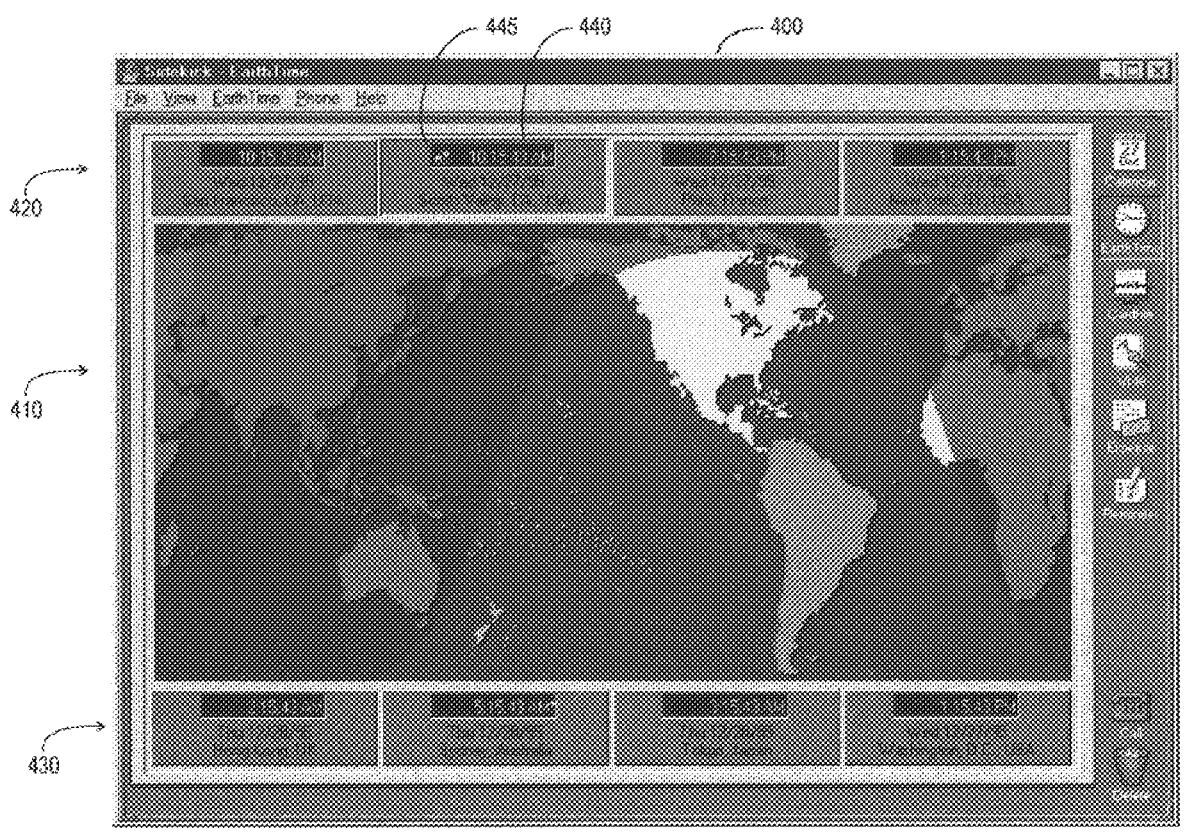

FIG. 4 illustrates a preferred interface of the present invention—the EarthTime™ interface—for providing a visual representation of time. To switch to this view, the user need only select the EarthTime™ icon 310, shown previously in FIG. 3. Visual representation 410 of time includes both day and night, showing travel of the Sun's light projection, as the earth rotates. In a preferred embodiment, the projection used is a modified mercator projection.

Also shown, the interface 400 includes a plurality of clocks, such as clocks 420, 430, showing the current time for various locales throughout the world. As is also shown, the user can designate from this interface his or her home time and local time. For instance, clock 440 includes a user-settable indicator 445, for indicating that the corresponding time zone (for that clock) is home time or local time.

Figure 5A:
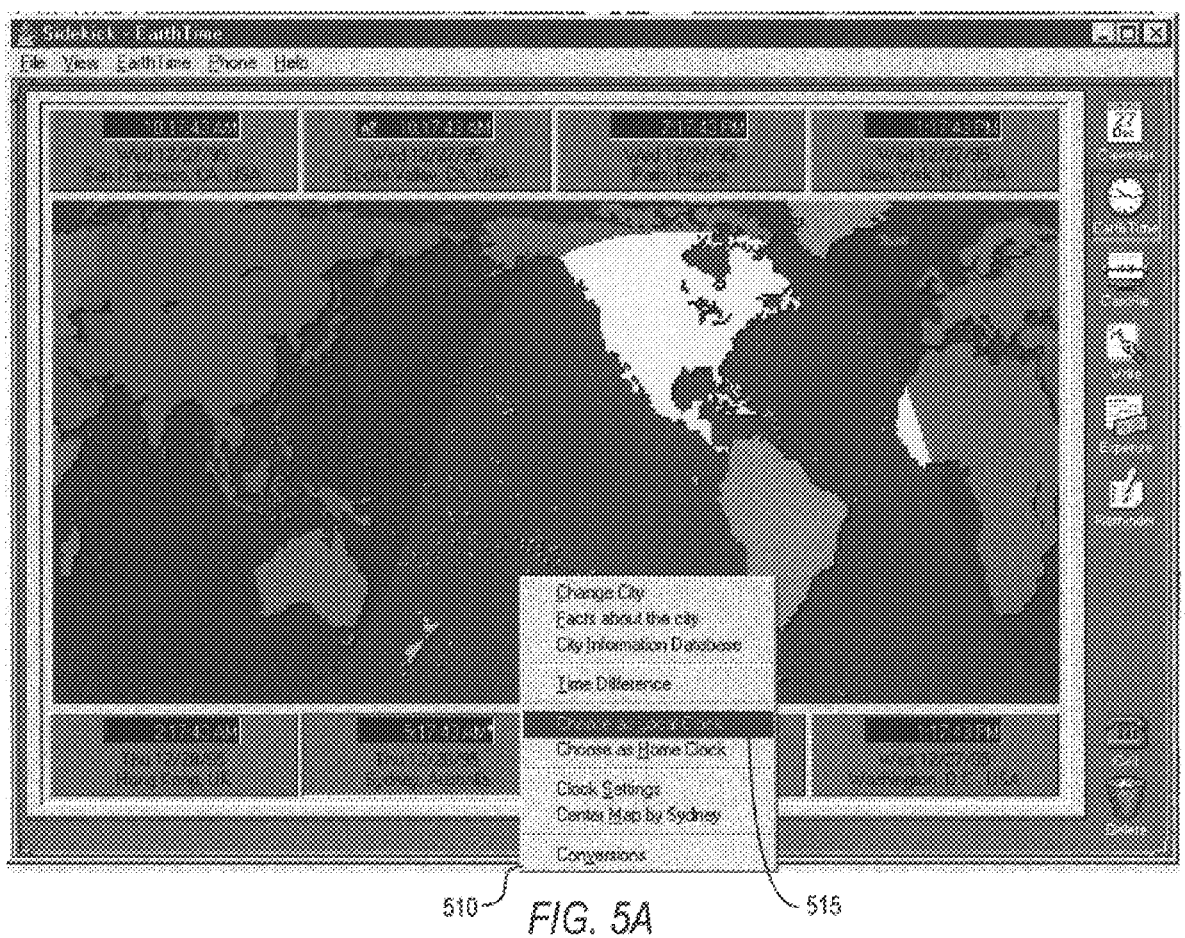
Figure 5B:
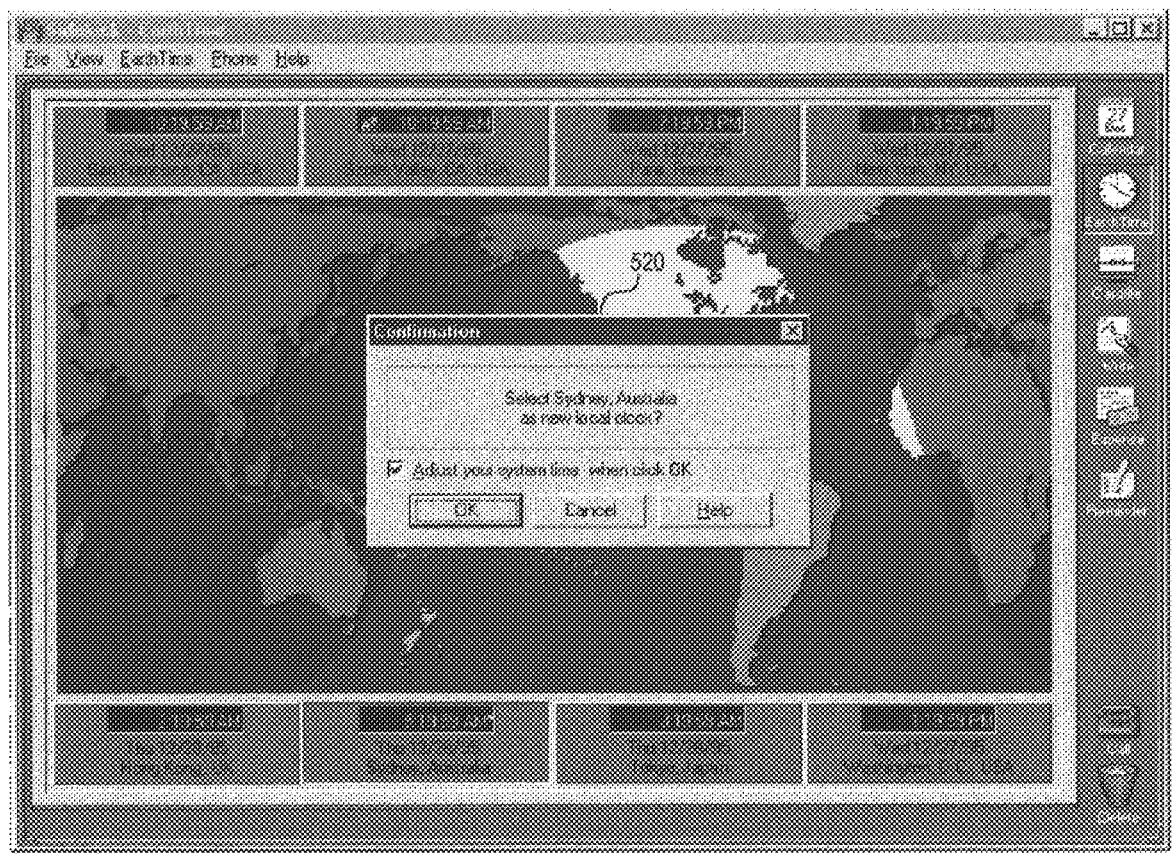

FIGS. 5A–B illustrate setting the local time. Upon arriving in a new time zone, the local time of the system is set to a new time zone. The can be done in an automated fashion, such as by using broadcasted reference signals (e.g., PBS time signals, global positioning satellite signals, or the like), or done manually. The manual approach can be done by the user specifying a new time zone, or by the system detecting that the user has set the system clock to a new time. To avoid the requirement of added hardware, the presently preferred embodiment relies on the user to set the local time, upon arrival at a particular destination. This need be done, of course, only for those users who are traveling across time zones.

To set the local time, the user selects (e.g., right-mouse clicks) on the clock corresponding to the time zone which is now the local time. As shown in FIG. 5A, this invokes a pop-up menu 510. Next, the user selects "Choose a local clock" menu choice 515. In response, the system displays a Confirmation Dialogue 520, as shown in FIG. 5B. This dialogue asks the user to confirm whether the system time should be adjusted. Upon the user confirming by selecting "OK," the system updates the local time by updating the system time and date.

Figure 6:
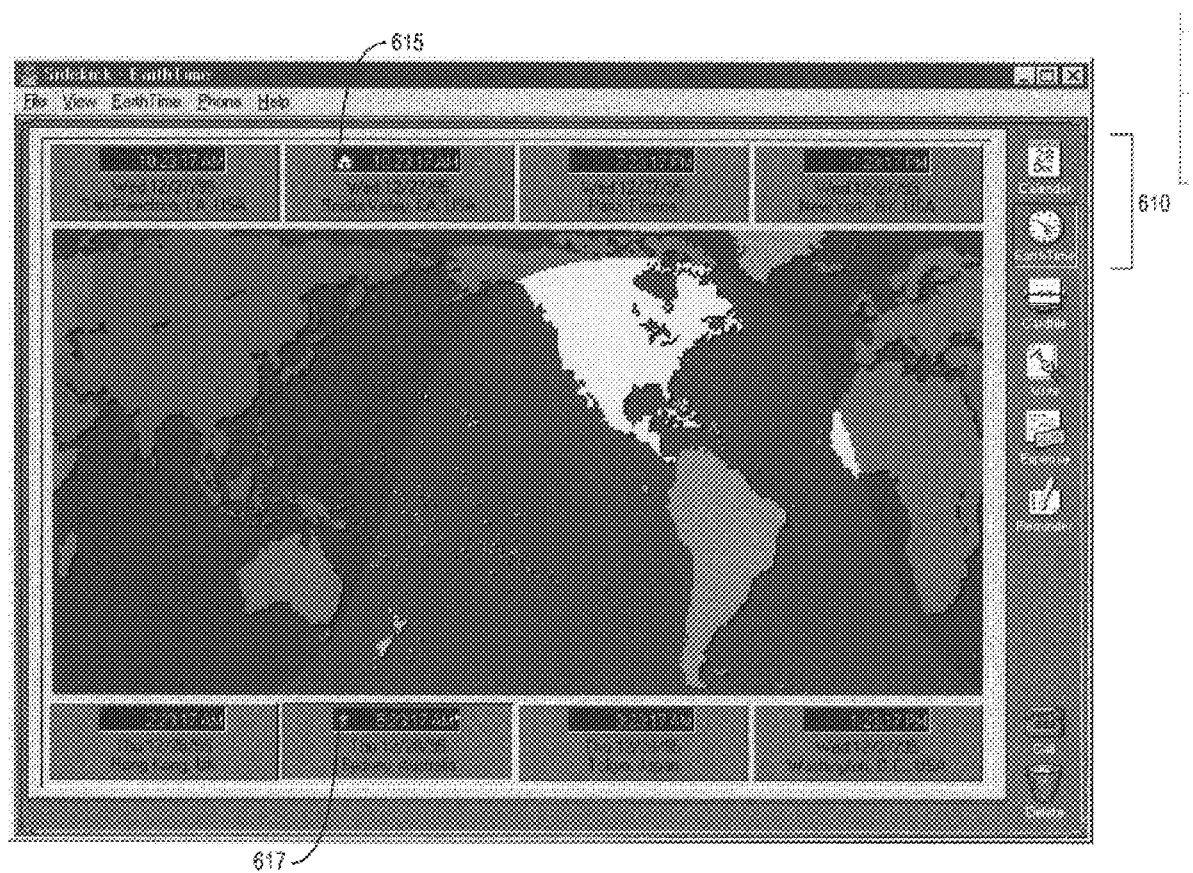
Figure 7:
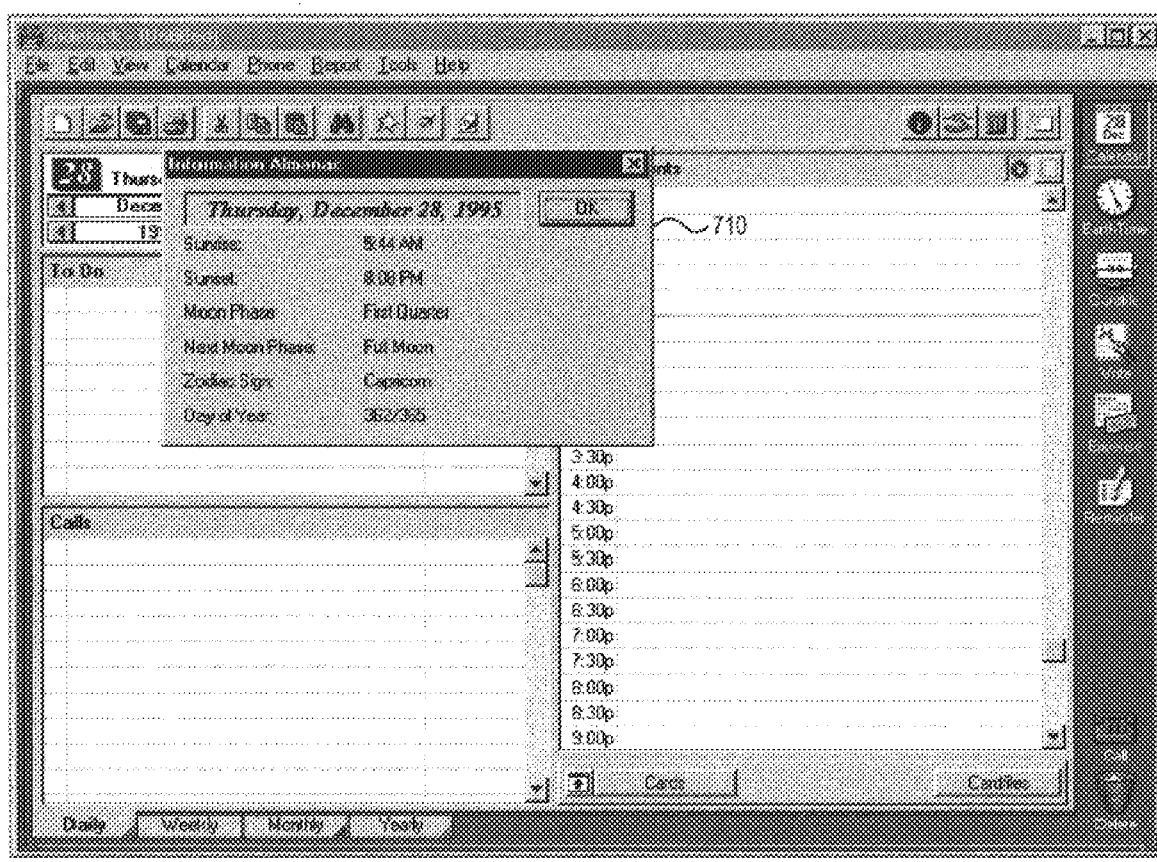

As shown in FIG. 6, components of the system which are dependent on local time and date, such as icons 610, are updated for reflecting the new local time/date. Home time is indicated by the house icon shown at 615. Local time, on the other hand, is shown by the icon at 617. As shown in FIG. 7, when the almanac information is again invoked (from the calendar view), the sunrise and sunset data are updated to reflect the new local time, as shown by Dialogue 710.

In the calendar view, each appointment (optionally) includes a tag specifying home, local, and/or remote time. Local and home are times relative to where the user is traveling. Remote, on the other hand, is for appointments/events occurring in other time zones. Once a particular type of time has been associated with an appointment, the system automatically maintains the appointment for that type of time. If, for instance, the user sets up a recurring alarm to ring every week day ten minutes before the close of the Hong Kong stock exchange, such as 4:50 PM remote time (i.e., Hong Kong time), the system will remind the user at the appropriate time. Note that this is a time which is neither local nor home time. Instead, it is a time which occurs remotely—that is, independent of the user's home or local time.

D. Clock setup

Figure 8A:
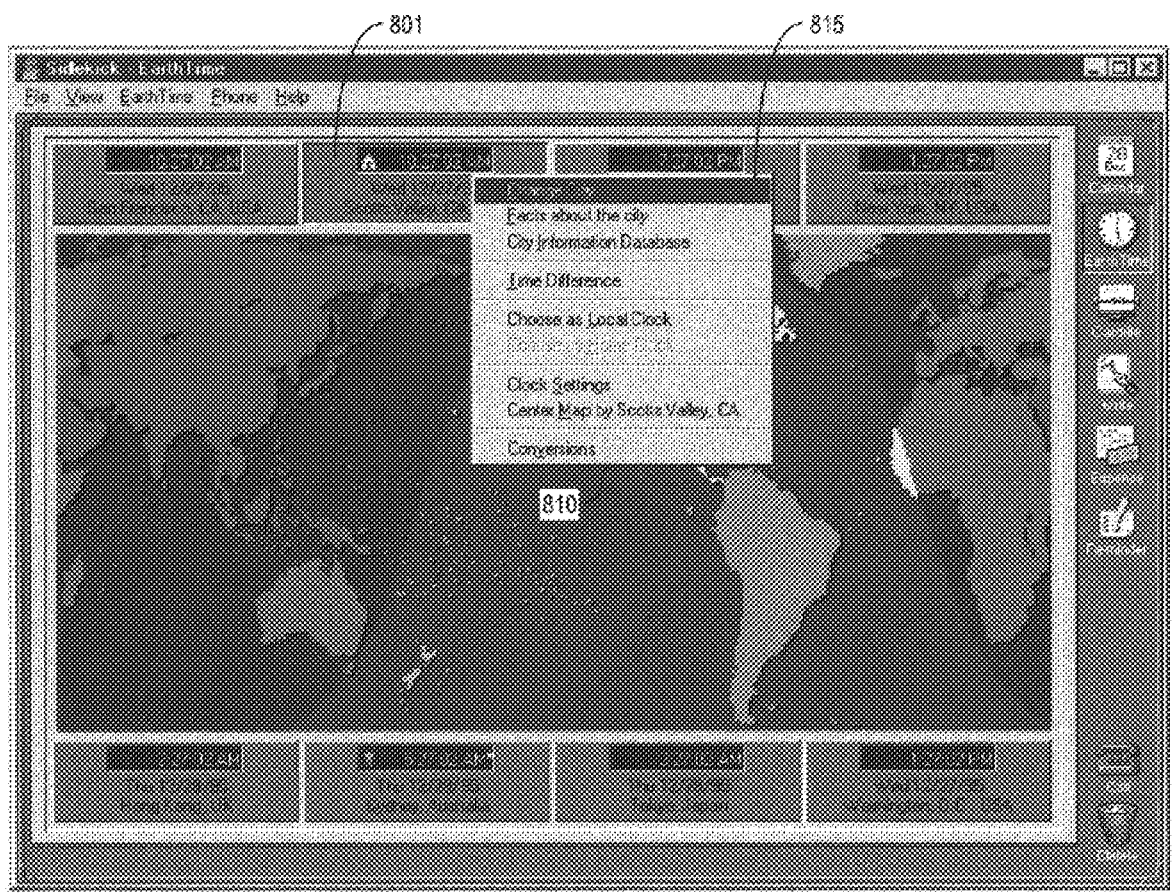
Figure 8B:
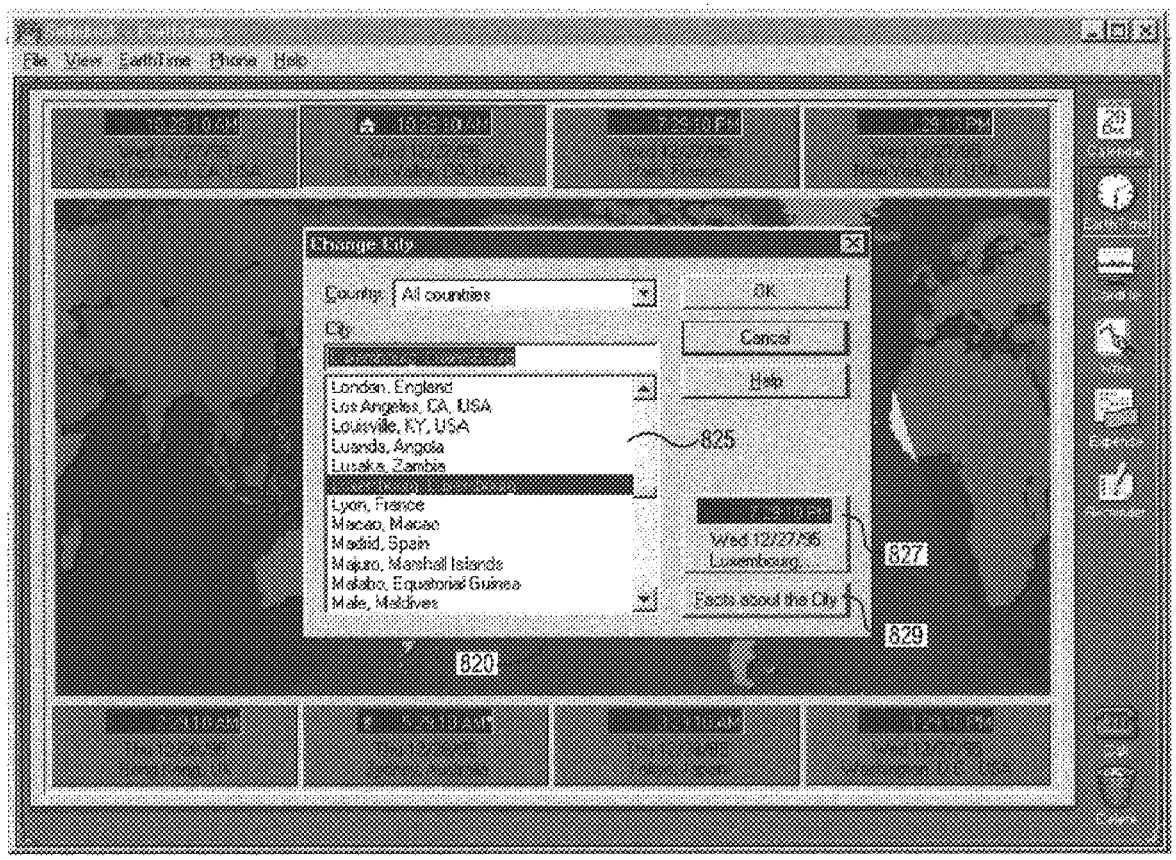
Figure 8C:
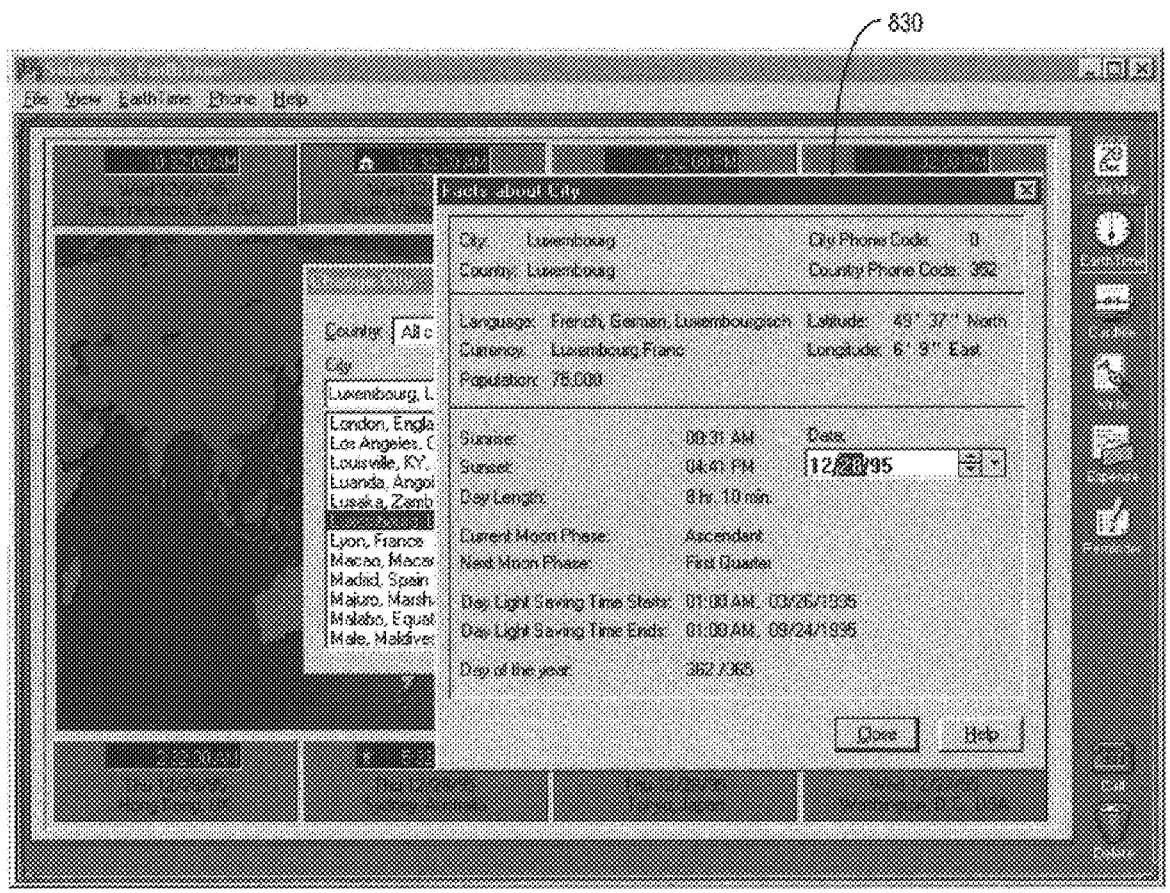

FIGS. 8A–B illustrate user operation of changing a clock to a new city. Upon the user selecting (e.g., right-mouse clicking on) a particular clock, such as clock 801, the system displays pop-up menu 810. To change the city, the user can select Change City menu option 815. As shown in FIG. 8B, the system, in response, displays a Change City dialogue 820. In an exemplary embodiment, a list 825 of 350 cities is provided. Also shown, the Dialogue 820 includes a Date/time Indicator 827 for indicating the current date and time of the currently-selected city. Additionally, a "facts about city" button 829 is provided. As shown in FIG. 8C, upon the user selecting the button 829, the system displays Facts about city Dialogue 830. Here, the system displays information about country code, city code, currency, and the like. Returning to the Dialogue 820, if the user selects "OK," the clock (i.e., clock 801) is updated to now display information for the newly-selected city.

E. City setup

Figure 9:
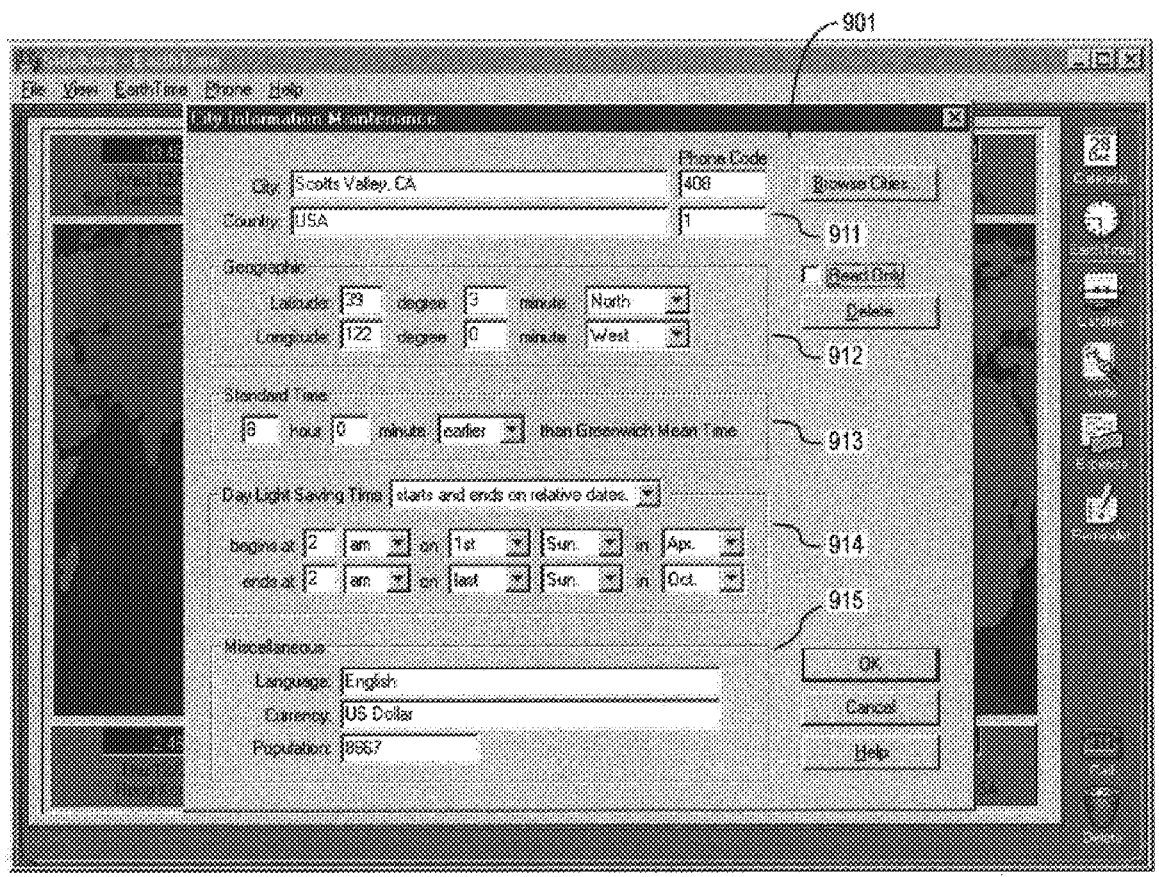

FIG. 9 illustrates a City information maintenance Dialog 901, which allows the user to modify city information, including adding and deleting cities from the database. As shown, the dialog includes a first section 911 for entering a city name, country, and phone code. The dialog includes a second section 912 for entering geographic information: latitude and longitude. In a third section 913, the dialog indicates the difference between standard time for this city and that of Greenwich Mean Time (GMT). The difference is indicated as earlier or later, depending on whether the city is located east or west of Greenwich. Fourth section 914 sets forth Daylight Savings Time—specifically when Daylight Savings Time begins and ends for this location. Finally, the dialog includes a fifth section 915 for indicating miscellaneous information about the city: language, currency, and population. Although most users will rely on the existing database of 350 cities, the dialog 901 allows the user the flexibility to add and/or modify cities, as desired.

F. Visual time calculator

Figure 10:
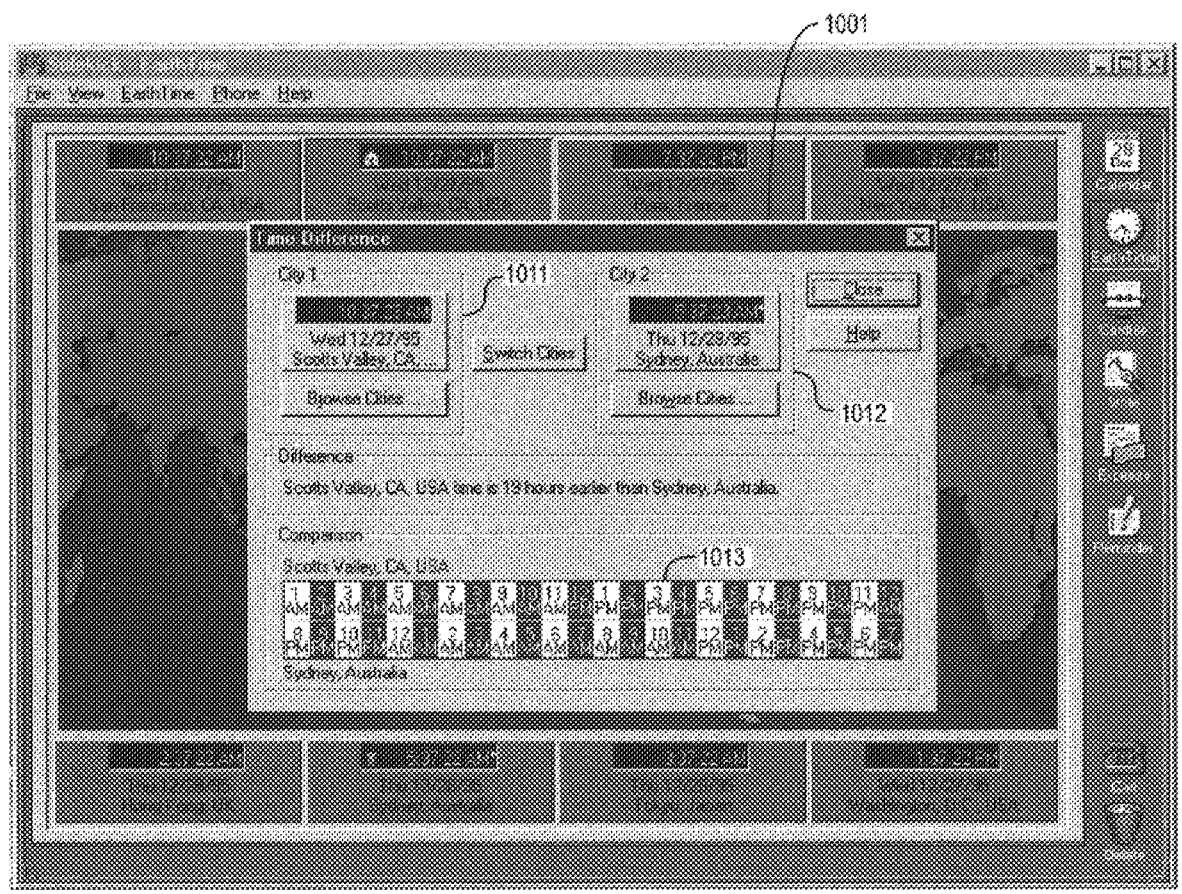

FIG. 10 illustrates a visual time or time difference calculator 1001. In use, the user selects a first city, shown at 1011, and selects a second city, shown at 1012. The current date/time for each is shown, respectively. Further, the dialog 1001 displays a comparison scale 1013. This allows the user to visually see the time in both places. Further, the user can visually select a time, by clicking on a desire time on the comparison scale 1013. In the fashion, the user can easily discern appropriate times for scheduling conferences or other events which span multiple time zones. For instance, the user can easily discern that a 10:00 am conference in Sydney, Australia equivalent to a 3:00 PM conference time in Scotts Valley, Calif. Note further that, since the scales are time/date aligned, the user can discern easily that the 3:00 PM Scotts Valley time occurs the next day in Sydney (i.e., after 12:00 midnight Sydney time).

Figure 11A:
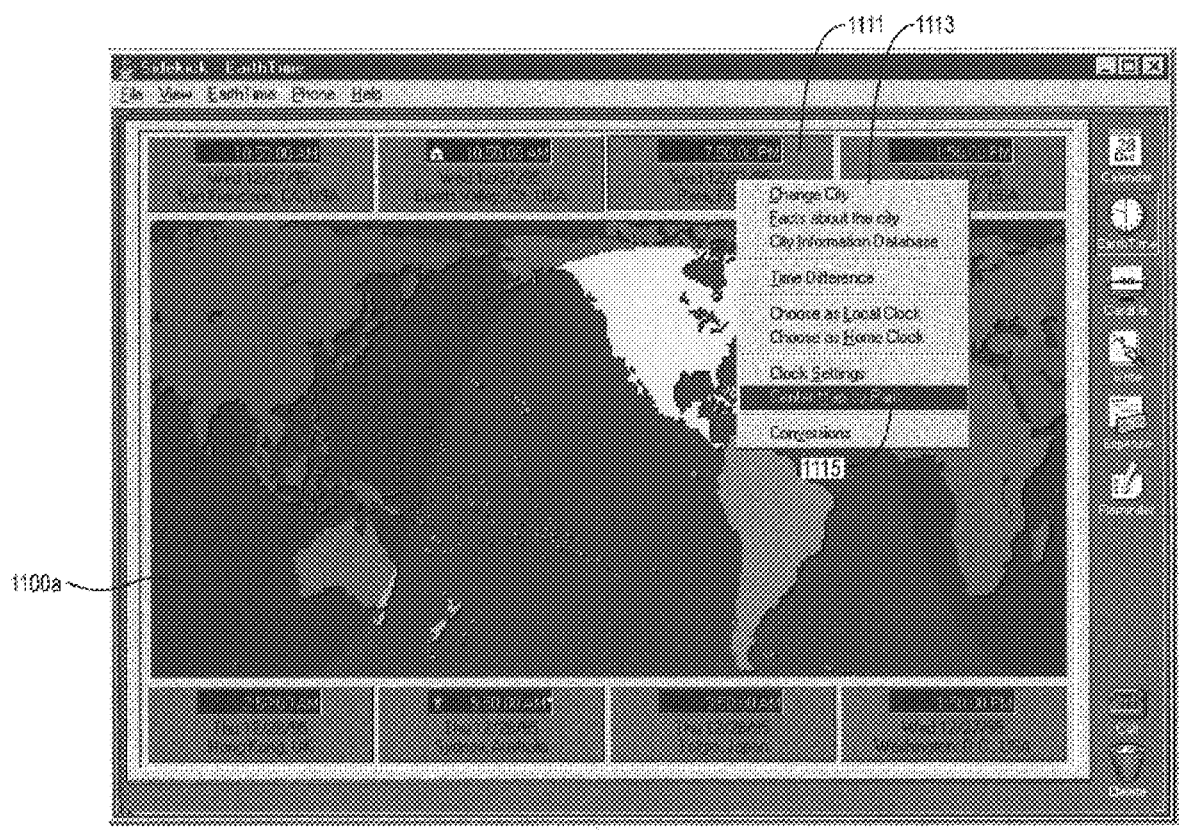
Figure 11B:
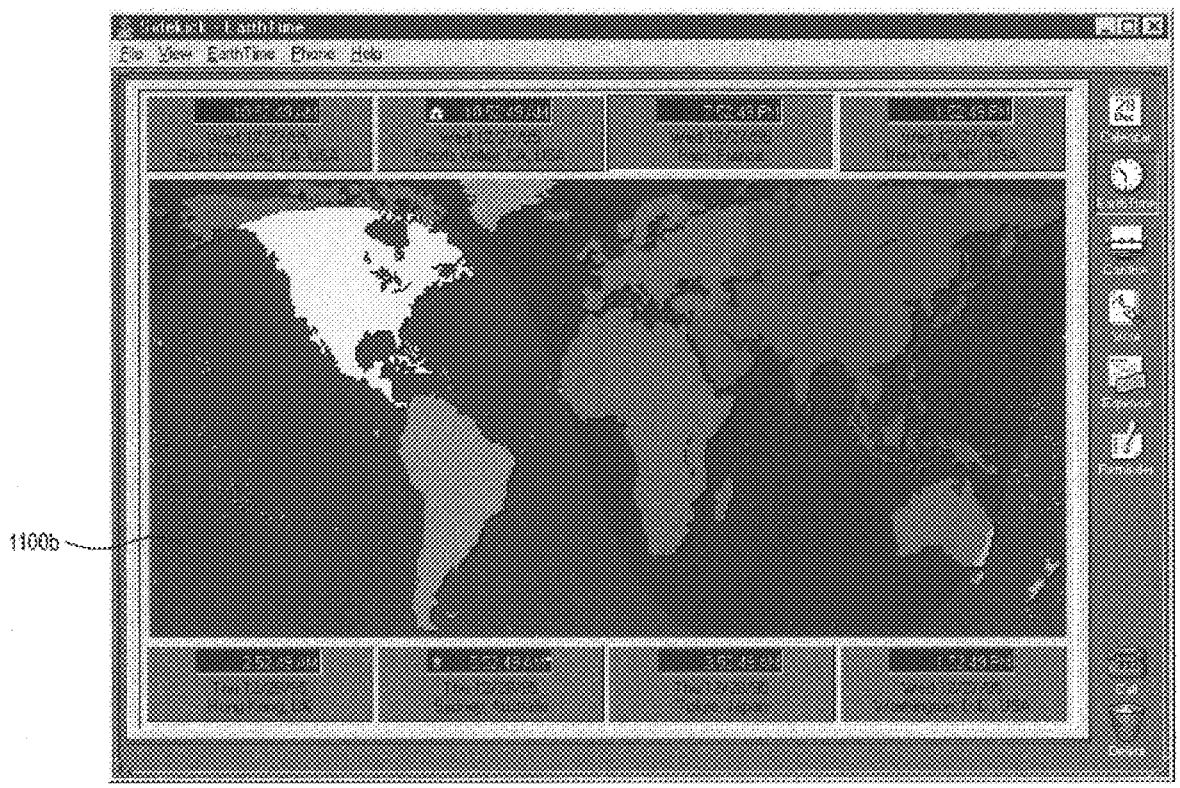

As shown in FIG. 11A, the mercator projection map 1100a can easily be centered on a desired location. To center on clock 1111 (i.e., Paris, France), for instance, the user right-mouse clicks on the clock. In response, the system displays pop-up menu 1113. Here, the user simply selects (i.e., clicks) center map by Paris 1115. In response, the system now centers the mercator projection map on Paris, as shown at 1100*b*.

Figure 12A:
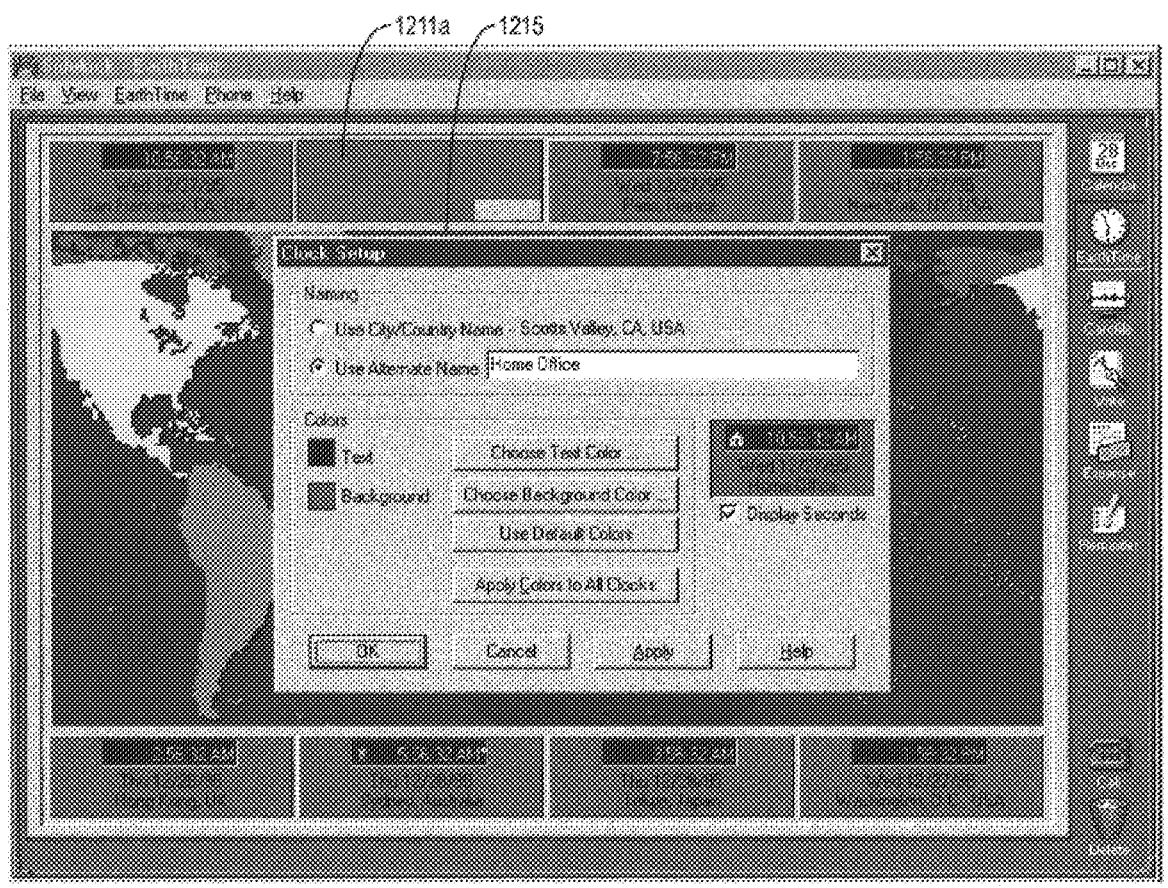
Figure 12B:
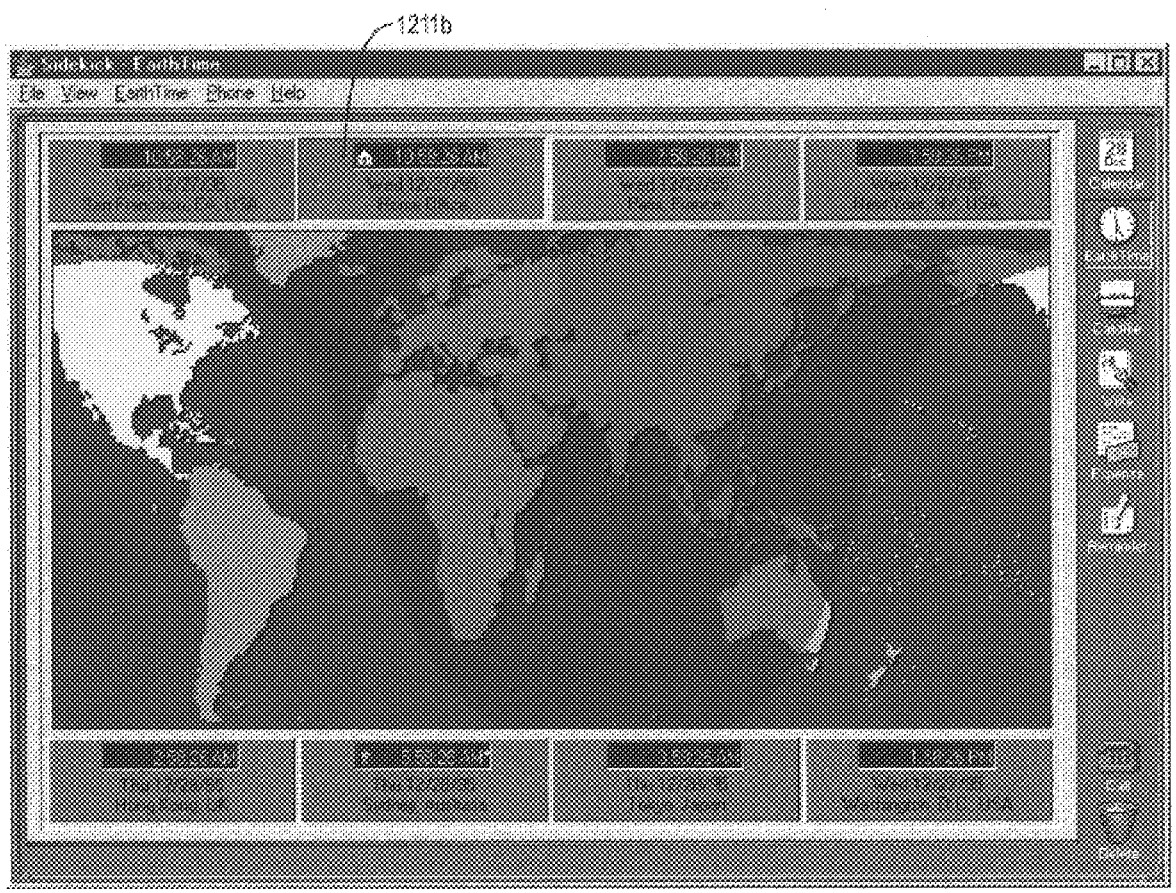

In a similar fashion, the user can modify the particular settings of a clock. For instance, the user can right-mouse click a particular clock and then select a "clock settings" menu choice from the pop-up menu (1113, previously shown in FIG. 11A). In response, the system displays a clock setup dialog 1215. Here, the user can enter an alternative name for the city location, such as "home office". Additionally, the user can specify color options which are employed for text and background display of the clocks. FIG. 12B illustrates changing Scotts Valley, Calif. (1211*a*) to home office (1211*b*).

Figure 13:
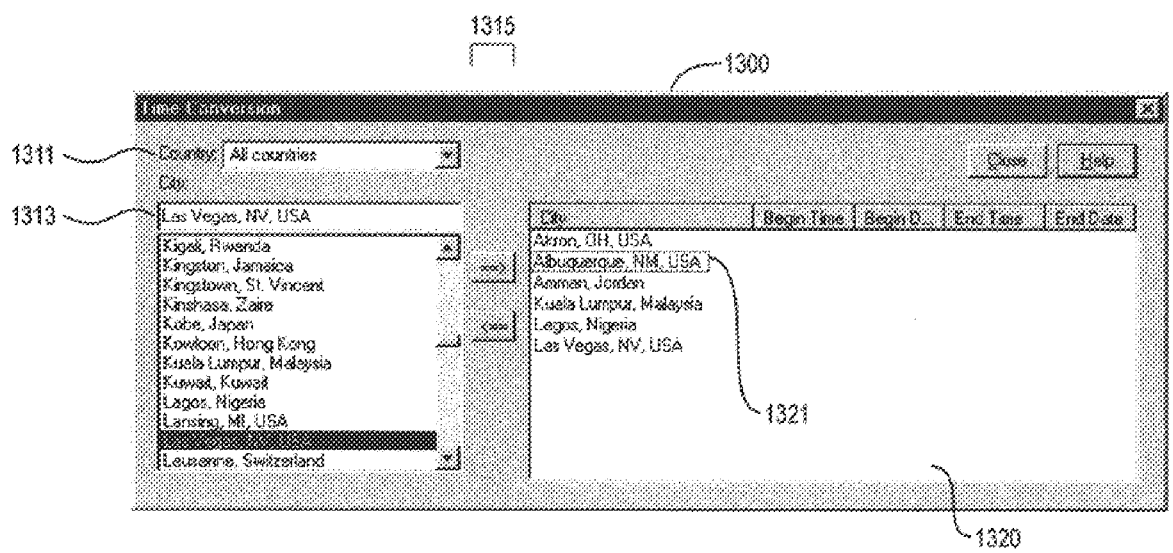

FIG. 13 illustrates a time conversion dialog 1300, which is employed for scheduling events among multiple sites. Here, the user selects which cities to include for time conversion, from city list 1313. The city list can be filtered by country, if desired, using the country list 1311. By using add/remove arrows 1315, the user can add or remove cities from the city conversion list 1320. Once a city is added, its beginning time, beginning date, ending time and ending date relative to other cities in the list are displayed. By selecting a particular city, such as Albuquerque, N.M. (shown at 1321), the user can enter new times and/or dates for the time conversion calculation. The other cities in the list (i.e., the non-selected cities) each has its corresponding values recalculated, upon a change in one or more values for the selected city (e.g., Albuquerque).

Internal Operation

A. General

Figure 14:
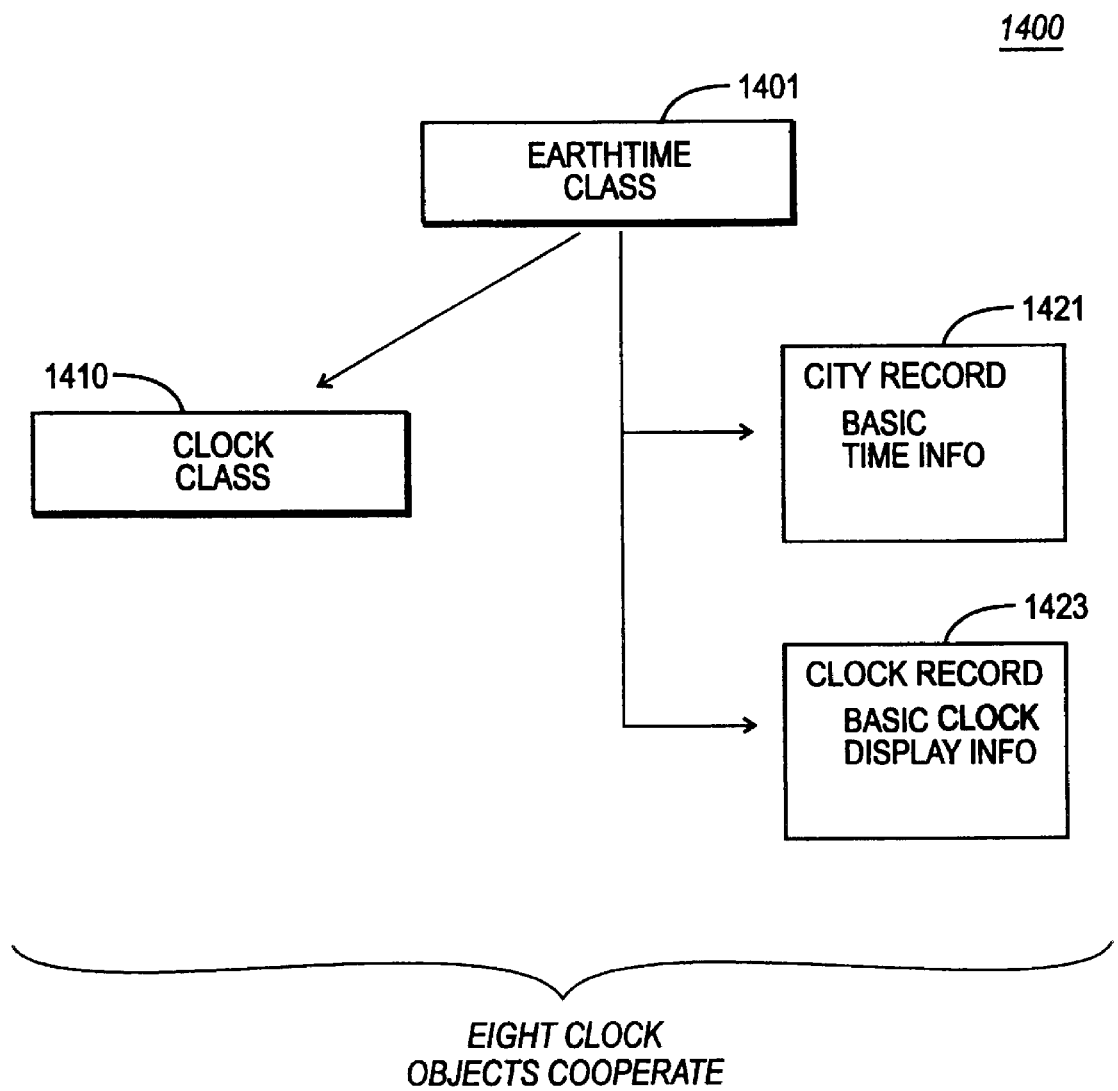
FIG. 14 is a block diagram illustrating a class hierarchy of the present invention which comprises EarthTime and Clock C++ classes.

In a preferred embodiment, the system is constructed using the C++ programming language. As illustrated in FIG. 14, a class hierarchy 1400 is constructed, which comprises an EarthTime class 1401 and a Clock class 1410. The system also maintains a CityRecord 1421, which includes basic time information (per city), and a ClockRecord 1423, which maintains basic clock display information (i.e., for rendering a particular clock). In a preferred embodiment, eight clock objects are instantiated at runtime. Operation of the system is directed by cooperation of the clock objects. The data structures and classes will now be described in further detail.

B. CityRecord data structure

In an exemplary embodiment, a CityRecord can be constructed as follows (using the C/C++ programming language).

```
 1:    // Data struct for city
 2:
 3:    struct CityRecord
 4:    {
 5:       char city[26];
 6:       char country[36];
 7:       short latitude;    // = degree * 100 + minute with sign consideration
 8:       short longitude:   // = degree * 100 + minute with sign consideration
 9:       char hourDiffToGMT;
10:       char minuteDiffToGMT;
11:       char compareToGMT;    // earlier or later than GMT (i.e., East or West)
12:       char DLSStd;                      // Daylight saving time standard code
13:
14:       char beginAmPm;              // These five items describe when DLS begins.
15:       char beginHour;
16:       char beginWeek;
17:       char beginDay;
18:       char beginWeek;
19:
20:       char endAmPm;                // These five items describe when DLS ends
21:       char endHour;
22:       char endWeek;
23:       char endDay;
24:       char endMonth;
25:
26:       // City facts -- misc.
27:       unsigned short countryCode;
28:       unsigned short cityCode;
29:       char currency[49];
30:       char language[45];
31:       long population;
32:
33:       unsigned short index;    // database housekeeping
34:       char voidFlag;           // . . . and when record deleted
35:    };
```

(line numbers added for clarity of the following description)

The data members are as follows. The first data member, city, stores a character string for the name of a particular city, as shown at line 5. In a similar manner, the country data member (line 6) stores a string for the country where the city is located. The next two data members, latitude and longitude (lines 7–8), are (short) integer data members storing latitude and longitude, respectively. These are followed by data members characterizing the time (zone) of the city, relative to Greenwich meantime (GMT), as shown at 9–11.

At line 12, the record stores a Daylight Saving Time standard code for the city. Daylight savings time for the city is further characterized by a first set of data members (lines 14–18) characterizing when Daylight Savings Time (DLS) begins. In a corresponding manner, a second data set (lines 20–24) includes data members characterizing when DLS ends.

Miscellaneous information for the city is stored at lines 27–31. For instance, the first two items thereat store the telephone country code and city code for the city. This is followed by currency (line 29), language (line 30), and population (line 31). Finally, the city record stores an index (line 33) and a voidlrag (line 34), for database housekeeping.

C. ClockRecord data structure

In an exemplary embodiment, the ClockRecord can be constructed as follows (using the C/C++ programmning language).

```
 1:    // Data structs for clock
 2:
 3:    struct ClockRecord
 4:    {
 5:      char city[26];
 6:      char country[36];
 7:      char alternateName[61];
 8:      int namingMode;
 9:      int homeClockFlag;
10:      // Local clock flag;
11:      int localClockFlag;    // formerly hmClockFlag
12:      int displaySecond;
13:      CLOLRREF bgColor;
14:      COLORREF txColor;
15:    };
```

The first data member, city, stores a text string for the name of the city, as shown at line 5. This is followed by the country data member, which stores a text string for the country where the city is located, shown at line 6. At line 7, the record includes an alternateName character string, for storing a user-specified alternative name for the city (e.g., "Home Office"). The namingMode member, at line 8, specifies whether the city name (i.e., the string stored by city) or the alternate name is employed as the name of the clock (e.g., for display). The homeClockFlag, at line 9, specifies whether the clock object which owns the particular clock record is the "home" clock. At line 11, the localClockFlag data member specifies whether this particular clock (object which owns this record) is the "local" clock. In an exemplary embodiment, the "local" clock is always set to the system clock. A clock can be both a "home" and a "local" clock (e.g., when the user is physically located at his or her home location).

The final three data members of the record control display. The displaySecond data member, at line 12, simply indicates whether seconds are displayed for the clock. Finally, the bgColor data member and the txColor data member (lines 13–14) control background and text color, respectively.

D. Clock C++ class

In an exemplary embodiment, a Clock class can be constructed as follows (using the C/C++ programming language).

```
 1: // Clock class definition
 2:
 3: class Clock : public CObject
 4: {
 5:
 6:    public:
 7:
 8:      enum NamingMode { USE_CITY_NAME, USE_ALTERNATE_NAME };
 9:      enum HomeClock { YES, NO };
10:
11:      // constructor
12:      Clock(CityRecord &cityRec,
13:         ClockRecord &clockRec,
14:         CWnd *whereTodraw,
15:         EarthTime *earthTime = NULL);
16:
17:      virtual ~Clock();
18:
19:      // Access methods
20:      void setAlternateName(LPCTSTR name = NULL);
21:      LPCTSTR getAlternateName() const;
22:
23:      void setNamingMode(NamingMode namingMode);
24:      in getNamingMode() const;
25:
26:      void setHomeClockFlag(int flag);
27:      int getHomeClockFlag() const;
28:
29:      void setLocalClockFlag(int flag);
30:      int getLocalClockFlag() const;
31:
32:      int Clock::getDisplaySecond() const;
33:      void Clock::setDisplaySecond(int flag);
34:
35:      CWnd *setWhereToDraw(CWnd *whereToDraw);
36:      CWnd *getWhereToDraw() const;
37:
38:      // Orig. city name combined with country name
39:      LPCTSTR getOriginalName() const;
40:
41:      ClockRecord &getClockRecord();
42:
43:      void setCity(CityRecord &cityRec);
44:      CityRecord *getCity();
45:
```

```
 46:    // Make this clock (object) the current clock
 47:    static void setCurrClock(Clock *pClock);
 48:    Clock *getCurrClock() const;
 49:
 50:    void setAsHomeClock();
 51:    Clock *getHomeClock() const;
 52:
 53:    // Local time
 54:    void setAsLocakClock(); // formerly setAsHmClock();
 55:    Clock *getLocalClock() const; // formerly getLocalClock();
 56:
 57:    void setBgColor(COLORREF bgColor);
 58:    COLORREF getBgColor() const;
 59:
 60:    void setTxColor(COLORREF bgColor);
 61:    COLORREF getTxColor() const;
 62:    // Connection of this object to EarthTime object
 63:    // (i.e., other clocks)
 64:    EarthTime *getEarthTime();
 65:
 66:    CTime *getThisDLSBeginDate();
 67:    CTime *getThisDLSEndDate();
 68:
 69:
 70:
 71:    // Utilities
 72:    BOOL isItDLSTime(CTime &time);
 73:    void chooseAsHomeClock();
 74:    void chooseAsLocalClock(); // formerly, chooseAsHmClock()
 75:    void chooseAsCurrClock();
 76:    virtual void draw(int flag = 0); // draw clock
 77:    void erase();
 78:    void displayFacts(HWND hWnd) const;
 79:    CTime &getCurrentTime();
 80:    CTime &getCurrentGmtTime() const;
 81:
 82:    // Convert DST info (this clock) to internal C++ object/struct
 83:    void setThisClockVariables();
 84:
 85:    // Historical naming
 86:    // Convert DST info (local clock) to internal C++ object/struct
 87:    void setLocalClockVariables(); // formerly, setHomeClockVariables()
 88:
 89:    void forceFullRedraw();
 90:
 91:    // where drag operation begins
 92:    BOOL isItInTimeRect(CPoint point) const;
 93:
 94:
 95: ate:
 96:
 97:    // Convert city info to CTime object
 98:    CTime &convertThemToDate(char dlsStd,
 99:               char amPm,
100:               char hour,
101:               char week,
102:               char day,
103:               char month,
104:               int year = 0) const;
105:
106:    // Local (object) copy of Data Members
107:    CityRecord cityRec_;
108:    ClockRecord clckRec_;
109:
110:    char originalName_[61];
111:
112:    // Data members for drawing
113:    CWnd *whereToDraw_;
114:    int dayDrawnLast_;
115:    char lastTimeStr_[20];
116:    BOOL dlstFlag_; // DST flag -- indicate if in DST
117:    CRect timeRect_;
118:
119:    // Time difference
120:    CTimeSpan thisSTDToGMT_; // From this time to GMT
121:    CTimeSpan thisSTDToDLS_; // From DST to Std time for this city
122:
123:    CTime thisDLSBeginDate_;
124:    CTime thisDLSEndDate_;
125:
```

-continued

```
126:    // "Static" members -- only one copy of each for clock class objects
127:    static CTimeSpan localSTDToGMT__; // Difference from local Std to GMT
128:    static CTimeSpan localSTDToDLS__;
129:
130:    static CTime localDLSBeginDate__; // "local" formerly "hm"
131:    static CTime localDLSEndDate__;
132:    // "local" clock is always system clock
133:
134:
135:
136:    // Pointers to clock object
137:    // Optimization -- get to by single ptr deref to other clock objects
138:    static Clock *homeClock__;
139:    static Clock *localClock__; // formerly, hmClock
140:    static Clock *currClock__;
141:
142:    EarthTime *earthTime__;
143: };
```

At line 6, the "public" section of the class definition begins. At line 8, the class definition declares NamingMode to be an enumerated type of: USE_CITY_NAME or USER_ALTERNATE_NAME. At line 9, the class defines Home-Clock to be an enumerated type of YES or NO.

The constructor for the class is set forth at lines 11–15. As shown, the first parameter to the constructor is the (address of) particular CityRecord for the clock. This is followed by the (address of) ClockRecord, described above. The third parameter, whereToDraw, specifies the particular slot on screen where this particular clock (object) will be drawn. Finally, the last parameter specifies a (pointer to) particular EarthTime object—an object specifying a collection of eight clocks. Complementing the constructor is the destructor for the Clock class, which is set forth at line 17. The destructor is responsible for "cleanup," such as memory deallocation.

At lines 19–67, the method defines access methods—that is, methods for getting and setting data members of the class. The particular data member being operated on is indicated by the particular name of the getter or setter method. These methods may be implemented using conventional C++ techniques.

Next, the class definition defines several utility methods, beginning at line 71. At line 72, isItDLSTime indicates whether Daylight Savings Time is activated. At line 73, the method chooseAsHomeClock specifies that this clock object (i.e., instance of the class) is the "home" clock. In a corresponding manner, the method chooseAsLocalClock, at line 74, specifies that the clock object is the "local" clock. At line 75, the class defines a method for choosing the current clock object as the current (system) clock, chooseAsCurrClock.

At line 76, the class defines a draw method, for drawing a clock on screen. As shown, the method is defined as "virtual," thereby specifying that the particular implementation of the draw method is deferred to a subclass (i.e., a class which inherits from the Clock class). At line 77, the class defines an erase method, for erasing the clock which has been displayed on screen. Next, at line 78, the class defines a displayFacts method, for displaying facts about the particular city whose clock is being displayed. This is followed by two other "getter" methods: getCurrentTime at line 79 and getCurrentGmtTime at line 80.

At line 83, the class defines a method, setThisClockVariables, for converting Daylight Savings Time information for this clock object into an internal C++ object/data structure. In a similar manner, the class declares at line 87 a method, setLocalClockVariables, for converting Daylight Savings Time information for the local clock into an internal C++ object/data structure. At line 89, the class defines a method for forcing a full redraw of the clock, forceFullRedraw. As the last public method, isItInTimeRect is defined at line 92. This method determines where a drag operation begins (i.e., for drag-and-drop operations).

Beginning at line 95, the class defines private methods and data members. At line 98, convertThemToDate is defined for converting city information into a CTime object—a standard Microsoft Windows/Microsoft Foundation Classes (MFC) time object. Documentation of the CTime object can be found in Microsoft Visual C++ manuals, including Class Libraries User's Guide (Part No. 28113) and Class Libraries Reference (Part No. 24776), all available from Microsoft Corporation of Redmond, Wash. The disclosures of the foregoing are hereby incorporated by reference.

At line 107, the method defines a CityRecord data member. This stores a local copy of the city record which is passed in during construction of the Clock object (i.e., it is passed as an argument to the constructor for the Clock object). In a similar manner, a ClockRecord data member is defined at line 108, for storing a local copy of the clock record. The original name for the clock object (e.g., "New York") is stored in a character array, originalName__, which is defined at line 110.

At lines 112–117, the class defines a method and data members for drawing. Specifically, at line 113, the whereToDraw__ data member is defined for specifying where to draw the clock object; this member is an MFC CWnd data type (described in the above-referenced manuals). At line 114, the class defines a dayDrawnLast__ integer data member, for storing which day was drawn last. This data member "remembers" the day last drawn, so that when the clock is redrawn, the day will not be redrawn if it is unchanged. Similarly, the data member lastTimeStr__ is defined at line 115 for "remembering" the last time string which was drawn. The system will use this information to determine whether the time string needs to be redrawn (i.e., whether it has changed), upon a request to redraw the clock object. At line 116, the class defines a dlstFlag__, for indicating whether Daylight Savings Time is activated. Finally, for drawing, the class defines a timeRect__ data member, at line 117, for indicating the time rectangle—that is, the coordinates which define an on-screen rectangle for drawing the time information.

At lines 119–121, the class defines data members for storing differences between time zones. Specifically, at line 120, the class defines thisSTDToGMT__ for storing the time difference or span from GMr to the time for the clock object (i.e., the time zone to which this clock object has been set). At line 121, the class defines thisSTDToDLS_ for storing the time difference or span from Daylight Savings Time to Standard Time for the clock object. At line, the class declares a data member for storing the beginning date of Daylight Savings Time, thisDLSBeginDate_. Complementing this, the data member thisDLSEndDate_ is defined at line 124, for indicating the end date of Daylight Savings Time. Since all of these data members are declared to be "static," only one instance of each data member exists for all objects of class clock, as specified by the C++ programming language for static data members of a class.

At lines 136–140, the class defines static data members for storing (pointers to) the *homeClock_, the *localClock_, and the current clock *currClock_. Note again that since these data members are declared to be "static," only one instance of each data member will exist for all objects of class Clock. These class data members are declared as an optimization, so that the home clock, the local clock, or the current clock may be accessed simply through a single pointer dereference. Finally, at line 142, the class defines a (pointer to) *earthTime_ data member. Since the data member is not declared to be "static" the data member is local to each object instance of class clock.

E. EarthTime C++ class

In an exemplary embodiment, the EarthTime class may be constructed as follows (using the C++ programming language).

```
1:   // EarthTime(TM) class def
2:
3:   class EarthTime : public CObject
4:   {
5:     public:
6:
7:     EarthTime (CPtrList &buttonList,
8:                LPCTSTR cityFileName);
9:     virtual ~EarthTime();
10:
11:    // Access methods
12:    void setCurrClock(Clock *pClock);
13:    Clock *getHomeClocck() const;
14:    Clock *getLocalClock() const; // formerly, getHmClock()
15:    Clock *getCurrClock() const;
16:
17:    // Forbid user from opening two clocks for one city
18:    BOOL isTheCityHasClockOpened(CString &cityName) const;
19:
20:    // Get (ptr to) Clock List -- list of ptrs to eight clock objects
21:    CPtrList *getClockList();
22:
23:    // Utilities
24:    void updateAllClocks(int flag = 0); // refresh (e.g., every second)
25:    // Needed for mouse operation (e.g., rt-mouse click)
26:    Clock *getClockUnderMouseCursor(CPoint *p);
27:    // Apply user-selected color scheme to all clocks
28:    void applyColorsToAllClocks(COLORREF txColor, COLORREF
                  bgColor);
29:    // For drag and drop -- swap display positions
30:    void switchClocks(Clock *fromClock, Clock *toClock);
31:
32:    private:
33:
34:    // Local copies of Data Members
35:    CPtrList clockList_;
36:  char *cityFileName_;
37: };
```

The EarthTime class is derived from the CObject class, a standard MFC class, which is documented in the above-described Microsoft Visual C++/MFC documentation. At line 5, the class begins definition of public methods. At line 7, a public constructor is defined. As shown, the constructor takes arguments of a buttonList and a cityFileName. The buttonList corresponds to the areas on screen to display; each area is a "button." The cityFileName is a string indicating where the database information for a city can be found. Complementing the constructor is the destructor, defined at line 9. The destructor is responsible for "cleanup" of the object, such as freeing up memory which has been allocated.

At lines 11–15, the method defines access methods—setter and getter methods. Specifically, at line 12, the method is defined for setting the current clock. At lines 13, 14, and 15, the class defines getter methods for getting the pointer to) home clock, local clock and current clock, respectively.

At line 21, the class defines a method, getClockList, for getting the list of pointers to the clock objects, which, in a preferred embodiment, number eight total. As shown, all clock are incorporated into one high-level list, the Clock list. The list itself comprises a list of pointers to the above-described clock objects.

Beginning at line 23, the class defines utility methods. Specifically, at line 24, an updateAllClocks method is defined for refreshing the display of all clocks with the current time. In a preferred embodiment, this method is invoked once every second (i.e., once every clock tick). At line 26, the class defines a method for getting the clock which is currently under the mouse cursor, getClockUnderMouseCursor. This method is invoked, for instance, when the system is processing a right mouse click, for determining which clock the user is selecting.

At line 28, the class defines a method for applying new colors (i.e., text color and background color) to all clocks: applyColorsToAllClocks. This method operates in response to user input received during clock setup (e.g., from the Clock setup Dialog 1215 of FIG. 12A). As a final utility method, switchClocks is defined at line 30 for switching or swapping the display position of two clocks. This method operates in response to drag-and-drop input from the user.

Beginning at line 32, the class defines private data members. Specifically, local copies of data members are declared at lines 35 and 36, clockList and cityFileName, respectively.

F. Exemplary class methods

Exemplary use of the foregoing classes will now be illustrated by way of example, using specific C++ class methods.

1. EarthTime class method: isTheCityHasClockOpened

For the EarthTime class, for instance, the isTheCityHasClockOpened, for instance, may be constructed as follows.

```
1:   // Specific class method
2:
3:   BOOL EarthTime::isTheCityHasClockOpened (Cstring &cityName)
             const
4:   {
5:     POSITION pos;
6:     Clock *pClock;
7:     Cstring tmpStr;
8:
9:     for (pos = clockList_.GetHeadPosition(); pos != NULL;)
10:    {
11:      pClock = (Clock*)(clockList_.GetNext(pos));
12:      tmpStr = pClock->getOriginalName();
13:      if (tmpStr == cityName)
14:      {
15:        return TRUE;
16:      }
17:    }
18:
19:    return FALSE;
20:  }
```

As shown, the method is invoked with a string, cityName. At lines 5–7, the method declares local data members, as shown. At line 9, the method establishes a "for" loop for traversing the clocklist. At line 11, the method extracts the pointer to the clock object for the "next" member of the clockList. Then, at line 12, the method extracts the original name from the clock object and stores it in a temporary variable, tmpStr. The original name is compared to the cityName—the passed-in argument to the method. If the two are the same (i.e., the comparison is TRUE), the method returns TRUE, at line 15. Otherwise, the method returns FALSE, at line 19.

2. Clock class method: isItDLSTime

Exemplary use of the Clock class will now be illustrated. In an exemplary embodiment, the isItDLSTime method may be implemented as follows.

```
1:  BOOL Clock::isItDLSTime(CTime &tmpTime)
2:  {
3:     if (cityRec_.DLSStd == 0)
4:     {
5:        return FALSE;
6:     }
7:     if (thisDLsBeginDate_ < thisDLSEndDate_)
8:     {
9:        if (tmpTime >= thisDLSBeginDate_ && tmpTime <
               thisDLSEndDate_)
10:       {
11:          return TRUE;
12:       }
13:    }
14:    else
15:    {
16:       if (tmpTime >= thisDLSBeginDate_ || tmpTime <
              thisDLSEndDate_)
17:       {
18:          return TRUE;
19:       }
20:    }
21:
22:    return FALSE;
23: }
```

As shown, the class method is invoked with a CTime data structure, which is passed by reference. This data structure includes a particular time, tmpTime. At line 3, the method tests whether Daylight Savings Time is active for the current city (via the CityRecord). If Daylight Savings Time is not active, the method returns FALSE, at line 5.

At line 7 an "if" statement tests whether the Daylight Savings Time begin date is before (earlier) or after (later) the passed-in time. In the instance that the begin date is earlier (i.e., "if" statement holds TRUE), the method proceeds to line 9 to test whether the passed-in time is within the range of the Daylight Savings Time—that is, it is greater than or equal to the begin date and less than the end date. If this condition holds TRUE, the method returns TRUE at line 11.

For the instance where the "if" statement of line 7 is FALSE, the method proceeds to the "else" statement of line 14. Within this statement, the method tests whether the passed-in time is greater than or equal to the begin date or less than the end date. In either instance, the method returns TRUE. If the method does not return TRUE at line 11 or at line 18, it drops through to line 22, where it returns FALSE.

3. Clock class method: chooseAsHomeClock

The setting of a home clock is done by the chooseAsHomeClock method, which in an exemplary embodiment may be constructed as follows.

```
1:  void Clock::chooseAsHomeClock()
2:  {
3:     if (this == homeClock_)
4:     {
5:        return;
6:     }
7:
8:     // Set prior Home Clock to "NO"
9:     homeClock_->setHomeClockFlag(NO);
10:    // Set this one to Home Clock
11:    this->setHomeClockFlag(YES);
12:    setHomeClockVariables();
13: }
```

The class method is invoked with no arguments. At line 3, the method tests whether the homeClock_ (pointer) is equal to this clock object (i.e., the "this" pointer for the present clock object). If the condition holds TRUE, the method simply returns, at line 5. Otherwise, the method proceeds to set the homeClock_ to the current clock object.

At line 9, the homeClock_ flag for the prior home clock is set to "NO." Then, at line 11, the homeClockFlag for the present clock object is set to "YES." Finally, a subroutine is invoked at line 12 for setting the homeClock_ variable (i.e., static variable for the Clock class) to the "this" pointer for the present clock object. Thereafter, the method is done and may return. In a similar fashion, a clock object may be chosen as the local clock.

4. Clock class method: getCurrentTime

Getting current time at any location is done by the getCurrentTime method, which can be constructed as follows.

```
1:  CTime &Clock::getCurrentTime()
2:  {
3:     static CTime tmpTime;
4:     CTime gmtTime;
5:
6:     tmpTime = CTime::GetCurrentTime();
7:
8:     // No conversion is needed if this clock is the home one
9:     if (this == homeClock_)
10:    {
11:       return tmpTime;
12:    }
13:
14:
15:    // Get the GMT time
16:    gmtTime = getCurrentGmtTime();
17:
18:    // Get the standard time for this clock
19:    tmpTime = gmtTime - thisSTDToGMT_;
20:
21:    // Get the Day Light Saving time for this clock
22:    dlstFlag_ = FALSE;
23:    if (cityRec_.DLSStd)
24:    {
25:       if (thisDLSBeginDate_ < thisDLSEndDate_)
26:       {
27:          if (tmpTime >= thisDLSBeginDate_
28:             && tmpTime < thisDLSEndDate_) {
29:             tmpTime += thisSTDToDLS_;
30:             dlstFlag_ = TRUE;
31:          }
32:       }
33:       else
34:       {
35:          if (tmpTime >= thisDLSBeginDate_
36:             || tspTime < thisDLSEndDate_) }
37:             tmpTime += thisSTDToDLS_;
38:             dlstFlag_ = TRUE;
39:          }
40:       }
41:    }
42:
43:    return tmpTime;
44: }
```

At line 6, the method gets the current time (i.e., from the system clock) and stores it in a local variable. If the current clock (i.e., clock object for which this method is invoked) is the home clock, at lines 8–12, the current time is simply returned; no conversion is necessary. At line 16, GMT is computed. Then, at line 19, the standard time for the current time is determined, by subtracting the previously-described thisSTDToGMT_ data member (i.e., the time difference or span from GMT to the time for the clock object) from the GMT-computed time. Lines 21–41 adjust the time for Daylight Savings Time, in the event that Daylight Savings Time is in effect for the location. Finally, the converted time is returned, at line 43.

G. Management of events in different types of time

Figure 15B:
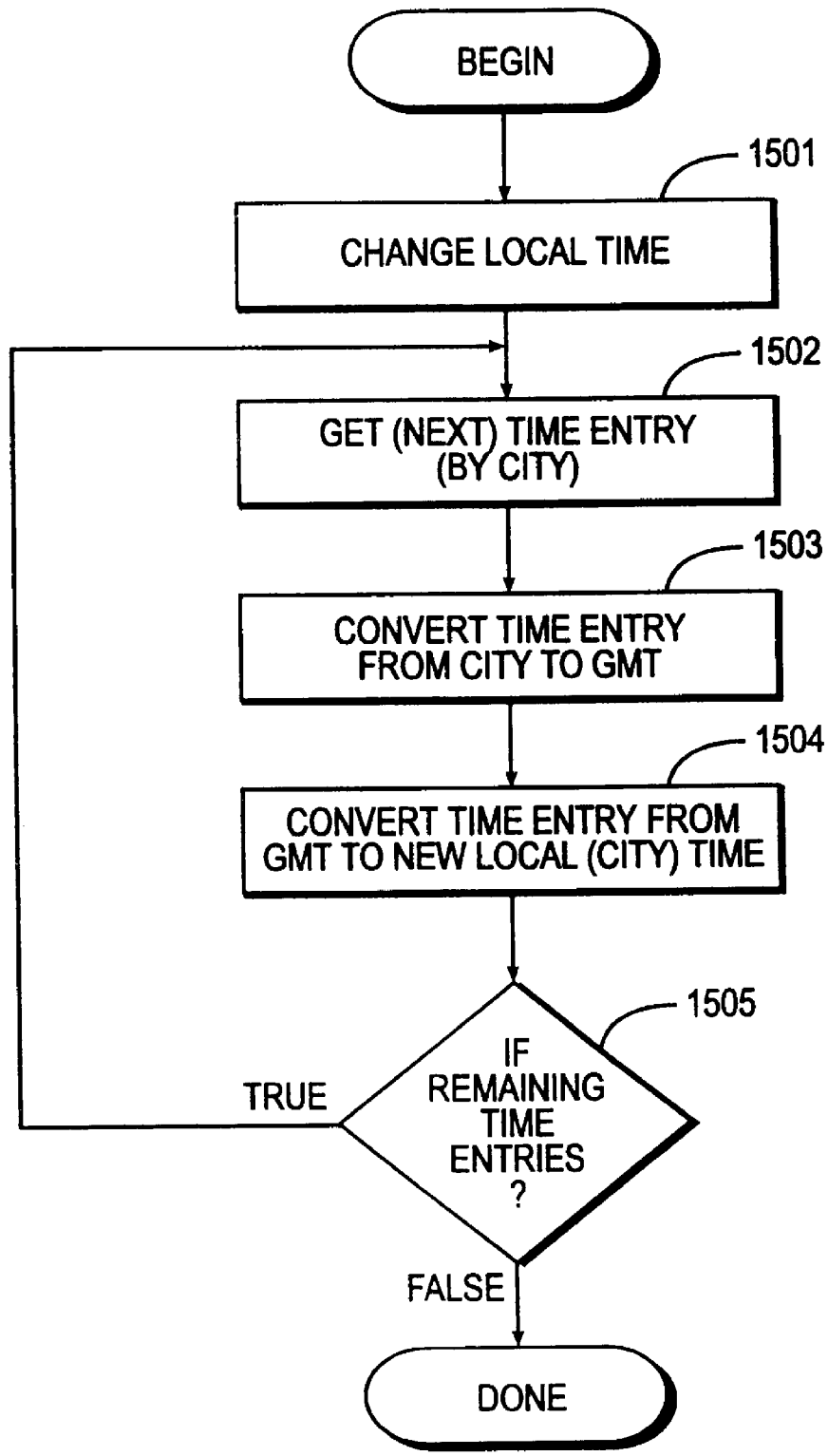
FIG. 15B is a flowchart illustrating a method of the present invention for converting time information among various types of time (e.g., converting 10 AM "home" time into a "local" time appropriate for the user's present locale).

FIGS. 15A–B illustrates conversion of appointments, events, and other time-based information into various types of time. This conversion allows the user to enter time-based information as one type of time (e.g., remote time), yet display the information as another type of time (e.g., local time).

Consider a user present in Scotts Valley, Calif. who has entered a 10 AM event in home time (e.g., staff meeting in Scotts Valley) and a 4:50 PM event in remote time (e.g., 10 minutes before close of Hong Kong Stock Exchange), as shown at 511. The time display for these events are as follows. As shown at 513, the staff meeting can be conveniently viewed as occurring at 10 AM home time, while 10 minutes before close of Hong Kong Stock Exchange can be conveniently viewed as occurring at 4:50 PM remote time. Perhaps more important to the user, however, is the local time view of these events. Since the user is at Scotts Valley (i.e., local time equals home time), the staff meeting continues to be shown at 10 AM local time. The time of 10 minutes before close of Hong Kong Stock Exchange, on the other hand, is shown as 1:50 PM (same day) local time. The system has automatically computed the local times for each, based on the user's current location.

At 521, the user has traveled to Sydney and has entered a 2:00 PM business appointment, in local time. The time display for the events are shown at 523. In particular, the 10 AM Scotts Valley event and the 4:50 PM Hong Kong event are automatically adjusted to display the events in the then-current local time. The Sydney event, on the other hand, remains at 2:00 PM local time since the user has not yet traveled to a new time zone (relative to that event). When the user does travel to a new time zone, the Sydney event can be updated to the then-current local time, if desired, using the above-described conversion.

FIG. 15B summarizes method steps of displaying various events in then-current local time for a user. Step 1501 indicates that local time has changed (i.e., from one time zone to another). This change can be manually entered by a user (e.g., either by manully changing the time zone, or by changing the system clock to the new local time), or entered using conventional automated means (e.g., Public Broadcasting Station time signal, Global Satellite Positioning, and the like). At step 1502, the system updates the events by looping through each event record or entry. At step 1503, the time entry for the event is normalized to GMT. Then, at step 1504, the entry can be readily converted to the then-current local time (adjusting from Daylight Savings Time, as needed). At step 1505, the method loops back to step 1502 for any remaining entries. Thereafter, the method is done.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system, a method for assisting a user with managing events which occur in different time zones, the method comprising:

providing an interface allowing the user to input events in a selected one of home time, local time, and remote time, said home time comprising a time zone in which the user normally resides, said local time comprising a time zone in which a user who is traveling is presently located, said remote time comprising any time zone other than the time zone for home time and the time zone for local time;

receiving input from the user for scheduling events which occur in different time zones, said input including entering events in a selected one of home time, local time, and remote time; and displaying to the user in local time all events which the user has entered, regardless of which time zone each event was initially entered.

2. The method of claim 1, wherein events which occur where the user normally resides are entered in home time.

3. The method of claim 1, wherein events which occur where the user is presently located are entered in local time.

4. The method of claim 1, wherein events which occur in a time zone for a location where the user does not normally reside and is not presently located are entered in remote time.

5. The method of claim 1, further comprising:

changing the time zone specified for local time to a new time zone;

updating said displaying to the user in local time all events, based on the new time zone.

6. The method of claim 5, wherein said changing the time zone step includes:

receiving user input for manually setting local time to a new time zone.

7. The method of claim 5, wherein said changing the time zone step includes:

detecting that the user has set a clock present in the system to a new time.

8. The method of claim 5, wherein said changing the time zone step includes:

automatically setting local time to a new time zone, upon detecting that the user has entered a new time zone.

9. The method of claim 1, wherein said displaying step includes:

converting each event entered in home time to local time; and converting each event entered in remote time to local time.

10. The method of claim 9, wherein converting each event entered in home time to local time comprises:

converting the event from home time into Greenwich Mean Time (GMT); and converting the event from GMT into local time.

11. The method of claim 10, wherein conversion of an event to and from GMT includes adjusting the event for Daylight Savings Time.

12. The method of claim 1, wherein displaying to the user in local time all events which the user has entered includes:

displaying to the user in local time the calendar date, day of the week, and time of day for each event which the user has entered.

13. The method of claim 1, further comprising displaying to the user in home time all events which the user has entered.

14. The method of claim 1, further comprising:

selecting a particular remote time zone for displaying events; and displaying to the user for the selected remote time zone all events which the user has entered.

15. The method of claim 1, further comprising:

displaying at said interface a plurality of clocks, said plurality of clocks including one clock showing current local time and another clock showing current home time.

16. A computer system for managing events which occur in different time zones comprising:

a computer having a processor, a memory and a display;

interface means allowing a user to input events in a selected one of home time, local time, and remote time, said home time comprising a time zone in which the user normally resides, said local time comprising a time zone in which a user who is traveling is located physically at any particular instance in time, said remote time comprising any time zone other than the time zone for home time and the time zone for local time;

an input device for the user for scheduling events which occur in different time zones, said input including entering events in a selected one of home time, local time, and remote time;

means for computing home, local, and remote times, for all events which the user has entered, regardless of which time zone each event was initially entered; and means for displaying to the user in a selected one of home, local, and remote time all events which the user has entered, regardless of which time zone each event was initially entered.

17. The system of claim 16, wherein said interface includes:

means for displaying a map representation indicating projection of the sun's current shadow on the earth.

18. The system of claim 16, wherein said interface includes:

means for displaying a plurality of clocks representing current time at various time zones.

19. The system of claim 18, wherein at least one clock displays current home time, and at least one clock displays current local time.

20. The system of claim 16, further comprising:

updating means for updating display of events in local time, upon the user traveling to a new time zone.

21. The system of claim 16, further comprising:

a system clock from which all times are computed.

22. The system of claim 21, further comprising:

means for re-setting the system clock to correct local time when the user travels to a new time zone.

23. The system of claim 22, wherein said means for re-setting the system clock to correct local time when the user travels to a new time zone includes means for receiving user input for entering a correct local time.

24. The system of claim 22, wherein said means for re-setting the system clock to correct local time when the user travels to a new time zone includes means for automatically detecting correct local time.

25. The system of claim 24, wherein said means for automatically detecting correct local time includes detecting a Public Broadcasting System signal indicating the correct local time.

* * * * *